United States Patent [19]

Cain et al.

[11] Patent Number: 4,905,233
[45] Date of Patent: Feb. 27, 1990

[54] MULTIPLE PATH ROUTING MECHANISM FOR PACKET COMMUNICATIONS NETWORK

[75] Inventors: Joseph B. Cain; Stanley L. Adams, both of Indialantic; Michael D. Noakes, Melbourne, all of Fla.

[73] Assignee: Harris Corporation, Melbourne, Fla.

[21] Appl. No.: 124,282

[22] Filed: Nov. 23, 1987

[51] Int. Cl.⁴ .............................................. H04Q 11/04
[52] U.S. Cl. ..................................... 370/94.1; 370/17; 370/54
[58] Field of Search .................. 370/94, 60, 13, 14, 370/17, 54, 104; 178/3

[56] References Cited

U.S. PATENT DOCUMENTS

| | | | |
|---|---|---|---|
| Re. 31,182 | 3/1983 | Crager et al. | 370/60 |
| 3,794,983 | 2/1974 | Sahin | 370/54 |
| 4,058,838 | 11/1977 | Crager et al. | 358/257 |
| 4,320,500 | 3/1982 | Barberis et al. | 370/60 |
| 4,399,531 | 8/1983 | Grande et al. | 370/94 |
| 4,550,397 | 10/1985 | Turner et al. | 370/60 |
| 4,569,042 | 2/1986 | Larson | 370/60 |
| 4,598,400 | 7/1986 | Hillis | 370/94 |
| 4,745,593 | 5/1988 | Stewart | 370/60 |

Primary Examiner—Douglas W. Olms
Assistant Examiner—Min Jung
Attorney, Agent, or Firm—Antonelli, Terry & Wands

[57] ABSTRACT

A mechanism for establishing at least one transmission route between a source node and a destination node in a multinode communications network comprises monitoring transmission characteristics of each of the transmission paths among the respective nodes of the network so as to derive a plurality of path metrics representative of the ability of the respective transmission paths of the network to transmit communication signals. Then, feasible transmission routes to be used for the transmission of communication signals from the source node to the destination node are selected as those routes which extend from the source node to the destination node and each of which is comprised of one or more transmission paths among the nodes of the network and the sum of path metrics of transmission paths from neighboring nodes to the destination node is less than the path metric of a transmission path the end nodes of which correspond to the source and destination nodes. Communication signals are then transmitted from the source node to the destination node over the selected feasible transmission routes.

20 Claims, 27 Drawing Sheets

Procedure *Multiple_Path_Route* ( )
*Shortest_Path* $(i, \mathbf{D}, \mathbf{M}_i, \mathbf{P}_i, \rho_i, \mathbf{C}_{\min}^i)$;
for $k:=1$ to $L_i$ do
   *Shortest_Path* $(m_k, \mathbf{D}, \mathbf{M}_{m_k}, \mathbf{P}_{m_k}, \rho_{m_k}, \mathbf{C}_{\min}^{m_k})$;
$S :=$ Null;    (* the set of feasible neighbors *)
for $j:=1$ to $n$  $(j \neq i)$ do
  for $k:=1$ to $L_i$ do
    if $M_i^j > M_{m_k}^j$ then
      begin   (* collect feasible paths and metrics *)
        $w_{im_k}^j := D_{im_k}(a, \tilde{f}_{im_k}) + M_{m_k}^j$;
        $w_{0im_k}^j := D_{im_k}(1, 0) + M_{0m_k}^j$;
        $w_{qim_k}^j := D_{im_k}(0, \tilde{f}_{im_k}) + M_{qm_k}^j$;
        $p_{im_k}^j := t_{im_k}^p + P_{m_k}^j$;
        $S_i^j := S_i^j \cup \{k\}$;
      end;
for $j:=1$ to $n$  $(j \neq i)$ do
  *Route_Var* $(j, \phi_i^j)$;   (* assign routing variables *)

FIG. 4

Procedure *Route_Var* $(j, \phi_i^j)$ $t_2 := \infty;\ t_{min} := \infty;\ p_{min} := 0;\ C_{min\,j} := \infty;$
$W_{0tot}^j := 0;\ W_{qtot}^j := 0;\ \rho_{bot\,i}^j := 0;$
for $k \in S_i^j$ do begin          (* calculate feasible path weights *)
  $W_{0im_k}^j := \sqrt{M_i^j - M_{m_k}^j} / (w_{0im_k}^j)^2$
  $W_{qim_k}^j := \sqrt{M_i^j - M_{m_k}^j} / w_{qim_k}^j$
  $W_{0tot}^j := W_{0tot}^j + W_{0im_k}^j;\ W_{qtot}^j := W_{qtot}^j + W_{qim_k}^j;$
  if $t_{min} \geq minimum\ (t_{min}, w_{0im_k}^j)$ then begin
    if $t_2 > t_{min}$ then
      $t_2 := t_{min};$
    $p_{min} := p_{im_k}^j;$
    $t_{min} := minimum\ (t_{min}, w_{0im_k}^j);$
    $C_{min\,j} := minimum\ (C_{im_k}, C_{min}^{m_k j});$ end;
  $\rho_{bot\,i}^j := maximum\ (\rho_{bot\,i}^j, \rho_{m_k}^j, \tilde{\rho}_{im_k}^j);$ end;
$\rho_{break}^j := 1 - (1 + C_{min\,j}(t_{max} - t_{min}))^{-1/2};$
$\rho_{crit}^j := minimum\ (0.8, \rho_{break}^j);$
$\tilde{\rho}_{bot\,i}^j := \alpha(\bar{p})\rho_{bot\,i}^j + [1 - \alpha(\bar{p})]\tilde{\rho}_{bot\,i}^j;$
if $\tilde{\rho}_{bot\,i}^j < \rho_{crit}^j$ then     (* calculate averaging function *)
  $\eta^j := 0$
else
  $\eta^j := (\rho_{bot\,i}^j - \rho_{crit}^j)/(1 - \rho_{crit}^j);$
*Zero_$\phi$* ( );
for $k \in S_i^j$ do begin          (* calculate routing variables *)
  $\phi_{0im_k}^j := W_{0im_k}^j / W_{0tot}^j;$
  $\phi_{qim_k}^j := W_{qim_k}^j / W_{qtot}^j;$
  $\phi_{im_k}^j := (1 - \eta^j) \phi_{0im_k}^j + \eta^j \phi_{qim_k}^j;$ end;

FIG. 4 B

| Event-Driven Failure Recovery |
|---|
| dispatch on *LNK_FAIL* (*link*) do    (* (5) *)<br>  *Unreach_Nodes* (*NO_PATH*, *link*);<br>dispatch on *NO_PATH* (*link*) do    (* (6) *)<br>  *New_Unreach_Nodes* (*NO_PATH*, *link*);<br>dispatch on *PATH* (*link*) do    (* (7) *)<br>  *New_Reach_Nodes* (*PATH*, *link*); |

FIG. 6

| Procedure *Unreach_Nodes* (*NO_PATH*, *link*) |
|---|
| (* Called on *LNK_FAIL* event -- modify *old_*$\phi$ *) |
| *no_unreach_nodes* := 0; |
| if *Old_Tables* = *TRUE* then begin |
|   *NO_PATH.seq_no* := $N_s$ - 1 (*mod* $N_{smax}$); |
|   *Failed_Links* := *Failed_Links* $\cup$ {*link*}; end |
| else |
|   *NO_PATH.seq_no* := $N_s$; |
| for *dest* := 1 to *n* do |
|   if *dest* $\notin$ *UR_Nodes* and $\phi_{im_{link}}^{dest} > 0$ then |
|     if $\phi_{im_{link}}^{dest} < 1$ then   (* Local alternate path *) |
|       *Rescale_*$\phi$ (*i*, *dest*, *link*) |
|     else  begin (* No local alternate path *) |
|       $\phi_{im_{link}}^{dest} := 0$; |
|       *no_unreach_nodes* := *no_unreach_nodes* + 1; |
|       *UR_Nodes* := *UR_Nodes* $\cup$ {*dest*}; |
|       *NO_PATH.unreach_nodes* [*no_unreach_nodes*] := *dest*; end; |
| *Scrub_R* (*link*, *all_nodes*); |
| if *no_unreach_nodes* > 0 then begin |
|   *NO_PATH.no_unreach_nodes* := *no_unreach_nodes*; |
|   *Send_All_Links* (*NO_PATH*); end; |
| if *USE_VC* = *TRUE* then |
|   *Disc_Link_VC* (*link*)   (* Disconnects all VC's on link *) |
| else |
|   *Copy_*$\phi$ ( ); |

FIG. 7

Procedure *New_Unreach_Nodes* (*NO_PATH*, *link*)
(* Called on *NO_PATH* message reception -- modify *old_$\phi$* *)
*no_reach_nodes* := 0; *no_unreach_nodes* := 0;
*seq* := *NO_PATH.seq_no*;
*PATH.seq_no* := *seq*; *S_NO_PATH.seq_no* := *seq*;
for *j*=1 to *NO_PATH.no_unreach_nodes* do begin
  *dest* := *NO_PATH.unreach_nodes*[*j*];
  if (*dest* $\notin$ *UR_Nodes*) and
  ((*seq*=$N_s$−1 (*mod* $N_{smax}$) and *Old_Tables* =*TRUE*) or *seq*=$N_s$) then
    begin
    if $\phi_{im_{link}}^{dest} < 1$ then begin   (* Local alternate path *)
      *Rescale_$\phi$* (*i*, *dest*, *link*);
      *no_reach_nodes* := *no_reach_nodes* + 1;
      *PATH.reach_nodes*[*no_reach_nodes*] := *dest*; end
    else begin     (* No local alternate path *)
      $\phi_{im_{link}}^{dest}$ := 0;
      *UR_Nodes* := *UR_Nodes* $\cup$ {*dest*};
      *no_unreach_nodes* := *no_unreach_nodes* + 1;
      *S_NO_PATH.unreach_nodes*[*no_unreach_nodes*] := *dest*; end;
    if (*USE_VC* = *TRUE*) then
      *Reassign_$\zeta$* (*dest*)
    else
      *Copy_$\phi^{dest}$* (*dest*);
    *Scrub_R* (*link*, *dest*); end;
end;
if *no_unreach_nodes* > 0 then begin
  *S_NO_PATH.no_unreach_nodes* := *no_unreach_nodes*;
  *Send_All_Links_But* (*S_NO_PATH*, *link*); end;
if *no_reach_nodes* > 0 then begin
  *PATH.no_reach_nodes* := *no_reach_nodes*;
  *Send_All_Links* (*PATH*); end;

FIG. 8

Procedure *New_Reach_Nodes* (*PATH*, *link*)

(* Called on *PATH* message reception -- modify *old_*$\phi$ *)
*no_reach_nodes* := 0;
*seq* := *PATH.seq_no*; *S_PATH.seq_no* := *seq*;
for *j* := 1 to *NO_PATH.no_reach_nodes* do begin
  *dest* := *PATH.reach_nodes*[*j*];
  if *dest* $\in$ *UR_Nodes* and
  ((*seq* = $N_s$ − 1 (*mod* $N_{smax}$) and *Old_Tables* = *TRUE*) or *seq* = $N_s$) then
    begin
    $\phi_{im_{link}}^{dest}$ := 1;
    *UR_Nodes* := *UR_Nodes* − {*dest*};
    *no_reach_nodes* := *no_reach_nodes* + 1;
    *S_PATH.reach_nodes*[*no_reach_nodes*] := *dest*;
    if (*USE_VC* = *TRUE*) then
      *Reassign_*$\zeta$ (*dest*)
    else
      *Copy_*$\phi^{dest}$ (*dest*);
    end;
  end;
if *no_reach_nodes* > 0 then begin
  *PATH.no_reach_nodes* := *no_reach_nodes*;
  *Send_All_Links_But* (*S_PATH*, *link*); end;

FIG. 10

| | |
|---|---|
| *START_TU* | Timer signal to start periodic topology update |
| *FINISH_TU* | Timer signal to finish topology update |
| *INS_TABLES* | Timer signal to install new routing tables |
| *LNK_FAIL* | Local detection of a link failure |

FIG. 11

TOP_MSG   Message flooded during periodic topology update

NO_PATH   Event-driven message sent to indicate unreachable node

PATH      Event-driven message sent to indicate reachable node

FIG. 12

```
type
   met_record =
      record
         link_cap : real;
         link_util : real;
         metric_tot : real;
         metric_zero : real;
         metric_queue : real;
      end type
   top_msg =
      record
         node_id : integer;
         no_neighbors : integer;
         neighbors : array [1..K] of integer;
         metrics : array [1..K] of met_record;
         no_in_cluster : integer;
         clus_members : array [1..CL] of integer;
         seq_no : integer;
      end
```

FIG. 13

```
type
   no_path =
      record
         node_id : integer;
         no_unreach_nodes : integer;
         unreach_nodes : array [1..n] of integer;
         seq_no : integer;
      end type
   path =
      record
         node_id : integer;
         no_reach_nodes : integer;
         reach_nodes : array [1..n] of integer;
         seq_no : integer;
      end
```

FIG. 14

| | |
|---|---|
| $N_s$ | Sequence number for topology update ($0 \leq N_s < N_{smax}$) |
| $new\_\phi_i^j$ | Target routing table being calculated |
| $old\_\phi_i^j$ | Target routing table currently being used |
| Old_Tables | TRUE between events START_TU and INS_TB |
| Time | Time-of-day from nodal clock |

FIG. 15

Procedure *Routing_Update* ( )

dispatch on *START_TU* do begin     (* (1) *)
  *Old_Tables* := TRUE;
  $N_s$ := *Get_Seq_No* (*Time*); *Init_List* (*Failed_Links*);
  *Assem_Status* (*TOP_MSG*); *Send_Flood* (*TOP_MSG*);
  end;
dispatch on *FINISH_TU* do begin     (* (2) *)
  *Multiple_Path_Route* ( );
  if *USE_VC* = *TRUE* then begin
    *Adjust_VC* ( );
    *Reassign_PKT* ( );   end;
  else
    *Copy_$\phi$* ( );
  *Diversity_Routes* ( ); end;
dispatch on *INS_TABLES* do begin     (* (3) *)
  *Swap_New_Tables* ( );
  *Old_Tables* := *FALSE*;
  *Resched_Events* (*Failed_Links*); end;
dispatch on *TOP_MSG* do     (* (4) *)
  *Update_Top_Tables* (*TOP_MSG*, D);
dispatch on *LNK_FAIL* (*link*) do     (* (5) *)
  *Unreach_Nodes* (*NO_PATH*, *link*);
dispatch on *NO_PATH* (*link*) do     (* (6) *)
  *New_Unreach_Nodes* (*NO_PATH*, *link*);
dispatch on *PATH* (*link*) do     (* (7) *)
  *New_Reach_Nodes* (*PATH*, *link*);

FIG. 16

```
Procedure Assem_Status (TOP_MSG)
Cluster_Status (TOP_MSG);    (* Get status of all cluster members *)
Get_Backbone_Status (Status);
TOP_MSG.node_id := i; TOP_MSG.seq_no := $N_s$;
$\bar{\rho}$ := $tot_\rho$ / $links_\rho$;
$\alpha$ := $\alpha_0$ * (1 – $\bar{\rho}$);    (* calculation of averaging parameter $\alpha$ *)
nbrs := cap_prev := cap_cur := j := $tot_\rho$ := $links_\rho$ := 0;
for k:=1 to $L_i$ do begin    (* Status of backbone neighbors *)
   if Prev_Status.UP[k] = TRUE then
      cap_prev := cap_prev + Prev_Status.metrics[k].link_cap;
   if Status.UP[k] = TRUE then begin
      if Near_Outage (k) = TRUE then    (* Link nearly out of range *)
         Status.metrics[k].link_cap := $\beta$ * Status.metrics[k].link_cap;
      nbrs := nbrs + 1;
      TOP_MSG.neighbors[nbrs] := Status.neighbors[k];
      if Prev_Status.UP[k] = TRUE and Prev_Status.neighbors[k] = Status.neighbor[k]
         Status.metrics[k].link_util := $\alpha$ * Status.metrics[k].link_util
               + (1–$\alpha$) * Prev_Status.metrics[k].link_util;
      else
         Status.metrics[k].link_util := 0.9;    (* New link this time *)
      cap_cur := cap_cur + Status.metrics[k].link_cap;  end;
   end;
lost_cap := (cap_prev – cap_cur) / cap_prev;
for k:=1 to $L_i$ do
   if Status.UP[k] = TRUE then begin
      if lost_cap > 0 then    (* Adjust $\rho$ for lost capacity *)
         Status.metrics[k].link_util := Status.metrics[k].link_util
               + (1 – Status.metrics[k].link_util) * lost_cap;
      j := j + 1;
      Metric (Status, k);
      TOP_MSG.metrics[j] := Status.metrics[k].link_cap;  end;
TOP_MSG.no_neighbors := nbrs;
Prev_Status := Status;
```

FIG. 17

```
Procedure Flood_Routing (pkt, link)
if (pkt.TYPE = Flood) then begin
   node := pkt.SA;      (* Source address *)
   seq := pkt.NSEQ;     (* Originating topology update interval *)
   if seq = N_s and seq ≠ Messages[node] then begin   (* New message accepted *)
      Messages[node] := seq;
      Gen_Event (TOP_MSG, pkt.DATA);
      Send_All_Links_But (pkt, link); end
   else       (* Message discarded *)
      Discard (pkt);
```

FIG. 18

```
type
    back_top =
        record
            no_neighbors : integer;
            seq_no : array [1..K *) of integer;
            neighbors : array [1..K] of integer;
            metrics : array [1..K] of met_record;
        end type
    topology :array [1..n] of
        record
            seq_no : integer;
            backbone : back_top;
            cluster : clus_top;
        end
```

FIG. 19

```
Procedure Update_Top_Tables ( )
node := TOP_MSG.node_id;  seq_no := TOP_MSG.seq_no;
for k:=1 to TOP_DB [node].back_top.no_neighbors do begin  (* List links being deleted *)
   nbrs := TOP_DB [node].back_top.neighbors [j]
   if Mess_Member (TOP_MSG, nbrs) ≠ TRUE   (* Delete other references to these links *)
       Delete (TOP_DB, nbrs, node);   (* in TOP_DB[nbrs] *)
   end;
TOP_DB [node].seq_no := seq_no;
TOP_DB [node].back_top.no_neighbors := TOP_MSG.no_neighbors;
for k:=1 to TOP_MSG.no_neighbors do begin   (* Copy topology to TOP_DB *)
   TOP_DB [node].back_top.neighbors [k] := TOP_MSG.neighbors [k];
   TOP_DB [node].back_top.metrics [k] := TOP_MSG.metrics [k];
   $tot_\rho$ := $tot_\rho$ + TOP_MSG.metrics [k].link_util;
   $links_\rho$ := $links_\rho$ + 1;  end;
$L_{delete}$ := Null;
for k:=1 to TOP_DB [node].back_top.no_neighbors do begin  (*Entries inconsistent with nbrs*)
   nbrs := TOP_DB [node].back_top.neighbors [k];
   if TOP_DB [nbrs].seq_no = seq_no and DB_Member (TOP_DB, nbrs, node) ≠ TRUE
       $L_{delete}$ := $L_{delete}$ ∪ {nbrs}
   else
       TOP_DB [node].back_top.seq_no [k] := TOP_DB [nbrs].seq_no;   (*get nbrs seq_no*)
   end;
for all nbrs ∈ $L_{delete}$ do
   Delete (TOP_DB, node, nbrs);   (* Delete these in TOP_DB[node] *)
for k:=1 to TOP_DB [node].back_top.no_neighbors do begin    (* Update nbrs DB *)
   nbrs := TOP_DB [node].back_top.neighbors [k];
   if TOP_DB [nbrs].seq_no ≠ seq_no then
      if DB_Member (TOP_DB, nbrs, node) = TRUE then
         Give_Seq_no (TOP_DB, nbrs, node, seq_no)
         (* to TOP_DB[nbrs].back_top.seq_no[] *)
      else
         Add_Link (TOP_DB, nbrs, node, seq_no);   (* to nbrs for (node, nbrs) link *)
   end;
```

FIG. 20

Procedure *Assign_New_VC* (*j*, *link_in*, *ckt_in*, *c*)
*Update_In_Ckt* (*link_in*, *ckt_in*);       (* Updates $V_{ij}$ and *VC_Table* [ ] *)
*best* := 0; $\zeta_{best}$ := 0;
for $k \in S_i^j$ do          (* Look for best link *)
  if ($\zeta_{im_k}^j > \zeta_{best}$) and ($\gamma_k + c \geq C_{im_k}$) then begin
    *best* := *k*; $\zeta_{best} := \zeta_{im_k}^j$; end;
if $\zeta_{best} > 0$ begin
  *Get_Out_Ckt* (*ckt*, *best*, *success*);  (* Updates *VC_Table* [ ] and *VC_Ret_Table* [ ] *)
  if *success* = *TRUE* then
    *Send* (*VC_REQ*, *best*);  end;    (* Contact next node on circuit *)
  else begin
    *Send_Dum* (*VC_REJ*, *best*);   (* Send dummy VC_REJ to myself *)
    *Free_Ckt_Tables* (*link_in*, *ckt_in*);  end;
else begin
  *Send* (*VC_REJ*, *link_in*);   (* Reject request *)
  *Free_Ckt_Tables* (*link_in*, *ckt_in*);  end;

FIG. 21

Procedure *Complete_New_VC* $(j, c, link, ckt)$
$u^j_{im_{link}} := u^j_{im_{link}} + c;$
$v^j_i := v^j_i + c;$
$\gamma_{link} := \gamma_{link} + c;$
*Update_Tables* $(link, j, ckt);$   (* Change virtual circuit state to "connected" *)
*Reassign_$\zeta$* $(j);$           (* Adjust packet routing variables *)

FIG. 22

| Procedure *Reassign_$\zeta$ (j)* |
|---|
| $\psi_{tot} := 0$;  $t_i^j := d_i^j + v_i^j$; |
| for $k \in S_i^j$ do begin      (* Proper proportions for packet routing variables *) |
| $\quad x_k := \zeta_{im_k}^j d_i^j$;  $\delta := [t_i^j \phi_{im_k}^j - u_{im_k}^j]/d_i^j$; |
| $\quad \psi_{im_k}^j := maximum\ (0, \delta)$;  $\psi_{tot} := \psi_{tot} + \psi_{im_k}^j$; end; |
| for $k \in S_i^j$ do begin      (* Normalize $\psi$ to $\zeta$ *) |
| $\quad \zeta_{im_k}^j := \psi_{im_k}^j/\psi_{tot}$;  $\gamma_k := \gamma_k + \zeta_{im_k}^j d_i^j - x_k$; end; |

FIG. 23

```
Procedure Handle_VC_REJ (link_out, ckt_out, c)
Look_Up_Ckt (link_out, ckt_out, link_in, ckt_in, j);
best := 0; ζ_best := 0;
VC_Table [link_in, ckt_in].blocked_links :=
    VC_Table [link_in, ckt_in].blocked_links ∪ link_out;
for k ∈ S_i^j do          (* Look for best link *)
  if (ζ_{im_k}^j > ζ_best) and (γ_k + c ≥ C_{im_k}) then
    and k ∉ VC_Table [link_in, ckt_in].blocked_links begin
    best := k; ζ_best := ζ_{im_k}^j; end;
if ζ_best > 0 then begin
  Get_Out_Ckt (ckt, best, success);  (* Updates VC_Table [ ] and VC_Ret_Table [ ] *)
  if success = TRUE then
    Send (VC_REQ, best); end;   (* Contact next node on circuit *)
  else begin
    Send_Dum (VC_REJ, best);   (* Send dummy VC_REJ to myself *)
    Free_Ckt_Tables (link_in, ckt_in); end;
else begin
  Send (VC_REJ, link_in);    (* Reject request *)
  Free_Ckt_Tables (link_in, ckt_in); end;
```

FIG. 24

| |
|---|
| Procedure *Disc_VC* (*link*, *ckt*, *direction*) |
| *Look_Up* (*link_out*, *link_in*, *ckt_out*, *ckt_in*, *c*, *dest*, *link*, *ckt*, *direction*); |
| $u^j_{im_{link\_out}} := u^j_{im_{link\_out}} - c;\ \ v^j_l := v^j_l - c;\ \ \gamma_{link\_out} := \gamma_{link\_out} - c;$ |
| if *direction* = *fwd* then    (\* Check for direction to send *VC_FIN* \*) <br>    *Send* (*VC_FIN*, *link_out*); <br> else <br>    *Send* (*VC_FIN*, *link_in*); <br> *Free_Ckt_Tables* (*link_in*, *ckt_in*);    (\* Free virtual circuit table entries \*) <br> *Reassign_ζ* (*dest*);         (\* Adjust packet routing variables \*) |

FIG. 25

```
Procedure Adjust_VC ( )
for j:=1 to n  (j≠i) do begin     (* For each destination j *)
  for vir_ckt ∈ V_{ij} do begin    (* Look at all circuits to destination j *)
    if VC_Table [vir_ckt.link_in, vir_ckt.ckt_in].link_out ∉ S_i^j then
        Disc_VC (vir_ckt.link_in, vir_ckt.ckt_in, both);   (* No longer a feasible path *)
    else begin     (* Adjust VC's on feasible paths *)
      c := vir_ckt.load;   (* Average load of existing circuit *)
      link := VC_Table [vir_ckt.link_in, vir_ckt.ckt].link_out;
      Δ := c/v_i^j;       (* Fraction of vc load to destination j *)
      Δ_1 := u_{im_{link}}^j /v_i^j - φ_{im_{link}}^j;    (* Excess vc load over φ assignment *)
      Δ_2 := minimum (Δ, Δ_1);
      if rand (0, 1) < ε Δ_1 (Δ_2/Δ)^2 then begin   (* Test for need to disconnect circuit *)
         v_i^j := v_i^j - c;  u_{im_{link}}^j := u_{im_{link}}^j - c;
         Disc_VC (vir_ckt.link_in, vir_ckt.ckt_in, both);  (* Disconnect virtual circuit *)
         end;
      end;
   end;
```

FIG. 26

```
Procedure Reassign_PKT ( )
for k:=1 to L_i do
    γ_{m_k} := 0;
for j:=1 to n (j≠i) do begin
    ψ_{tot} := 0;  t_i^j := d_i^j + v_i^j;
    for k ∈ S_i^j do begin      (* Proper proportions for packet routing variables *)
        δ := [t_i^j φ_{im_k}^j − u_{im_k}^j]/d_i^j;  ψ_{im_k}^j := maximum (0, δ);
        ψ_{tot} := ψ_{tot} + ψ_{im_k}^j;  γ_k := γ_k + u_{im_k}^j;  end;
    for k ∈ S_i^j do begin      (* Normalize ψ to ζ *)
        ζ_{im_k}^j := ψ_{im_k}^j/ψ_{tot};  γ_k := γ_k + ζ_{im_k}^j d_i^j;  end;
    end;
```

FIG. 27

MULTIPLE PATH ROUTING MECHANISM FOR PACKET COMMUNICATIONS NETWORK

The United States Government has rights in the present invention under NRL Contract N00014-86-C-2056.

FIELD OF THE INVENTION

The present invention relates in general to communication systems and is particularly directed to a scheme for near optimally routing digital data traffic among member nodes of a multinode packet-switched communications network in the presence of dynamic transmission path conditions.

BACKGROUND OF THE INVENTION

Path selection schemes for routing digital data traffic among member stations or nodes of a multinode packet-switched communications network typically employ some form of shortest path or minimal delay mechanism (commonly termed a path or link metric) for determining which route is to be used to transmit data from source to destination. One such scheme, known as ARPANET (described in an article entitled "The New Routing Algorithm for the ARPANET" IEEE Transactions on Communications, Vol. COM-28, May 1980, pp. 711-719), examines the path metrics of all possible links between source and destination and selects that path through the network whose total link metric total represents the lowest transmission delay. By always basing its routing decision on the shortest path metric, the ARPANET approach tends to introduce a substantial load imbalance among the nodes and subjects the shortest path to considerable traffic congestion.

To take advantage of the substantial capacity of the network that goes unused in an ARPANET type of scheme, there has been proposed an optimal traffic assignment mechanism in which all paths through the network are employed in an effort to minimize that average delay through the network, as described in an article entitled "A Minimum Delay Routing Algorithm Using Distributed Computation" by R. G. Gallager, IEEE Transactions on Communications Vol. COM-25, January 1977, pp. 73-85. In accordance with this optimal traffic assignment approach traffic from a source is subdivided into subportions which, in turn, are routed over a number of different source-to-destination highways. As traffic is subdivided and allocated to the different paths through the network the average delay of the respective links is examined and adjustments are made (traffic is selectively moved to links having lower path delays) so as to iteratively converge upon an optimal (lowest) average delay through the network. While this latter approach improves upon the use of the resources of the network, producing a low steady state delay, it is not readily suited for use in a dynamic environment where the connectivity among nodes is subject to unpredictable transient degradation or failure.

SUMMARY OF THE INVENTION

In accordance with the present invention there is provided a new and improved routing mechanism for use in a multinode communication network which obviates the drawbacks, yet enjoys the desirable attributes of the ARPANET and optimal traffic allocation schemes described above, namely speed and maximal use of entire network capacity. To this end the routing mechanism of the present invention examines the path metrics of all paths that extend from a source node to a destination node. Using the metric of the shortest path between the source node and the destination node as a reference, the metrics of all the shortest paths from all neighboring nodes to the destination node are examined to determine which path, if any, yields a metric total that exceeds the reference. A path whose metric exceeds that of the reference is eliminated as a possible candidate path for routing transmissions between the source and destination nodes. As a result, any path that includes a node which is located farther away from the destination node than the source node is eliminated as a candidate. (This requirement guarantees consistent routes without any loops).

Once all the 'non-feasible' candidate paths have been eliminated, the metrics of the remaining 'feasible' paths are employed to allocate the distribution of traffic between the source node and the destination node over all the feasible paths in inverse proportion to the path metric of each respective feasible path. As a consequence of this traffic allocation process, loading of the feasible paths of the network is effectively balanced with minimum average delay.

In accordance with a further aspect of the present invention, in the event of a connectivity failure within the network, the routing mechanism takes immediate action to make whatever adjustments to the presently employed routing scheme are necessary, so as to insure that the transmission of traffic through the network, is, at all times, effectively nearly optimally routed. For this purpose, incorporated into the routing mechanism is an 'event-driven' failure recovery procedure which reassigns the routing of traffic from a source node to a destination node by coordinating with other nodes in the rerouting process.

Pursuant to a further feature of the present invention, the routing and traffic allocation mechanism may be applied to networks that have been configured to operate as virtual circuits or for a network configured to provide both datagram and virtual circuit capability. Virtual circuit routing is effected in substantially the same manner as the datagram mechanism, wherein a loop-free feasible path to the destination is defined. This route, preferably having a lowest possible path metric total, over which the data packet traffic travels, becomes a permanent virtual circuit route. The routing variables that are established in accordance with the path metrics are used to select from among feasible paths at each node. The route selection process distributes the load, so that the average load carried by the virtual circuit approximates the distribution implied by the routing variables. The virtual circuit route from source to destination will remain dedicated for that purpose until rerouting is required, either due to a link failure along the route or due to traffic congestion.

BRIEF DESCRIPTION OF THE DRAWINGS

FIG. 4 depicts a Table 1 which lists the processing steps of a Multiple_Path_Route procedure for determining feasible paths and routing variables;

FIG. 4B depicts a Table 1A which lists the processing steps of a two-stage heuristic mapping procedure for determining feasible paths and routing variables;

FIG. 6 depicts a Table 2 which lists the processing steps of an Event-Driven Failure Recovery procedure;

FIG. 7 depicts a Table 3 which lists the processing steps of an Unreach_Nodes (NO_PATH, link) procedure for responding to a locally detected failure;

FIG. 8 depicts a Table 4 which lists the processing steps of a New_Unreach_Nodes (NO_PATH, link) procedure for responding to a remote loss of path;

FIG. 10 depicts a Table 5 which lists the processing steps of a New_Reach_Nodes (PATH, link) procedure for responding to a new path;

FIG. 11 depicts a Table 6 listing types of events in response to which the routing update mechanism is driven;

FIG. 12 depicts a Table 7 listing types of messages for driving the routing update mechanism;

FIG. 13 depicts a Table 8 listing the structure of a TOP_MSG used for topology updates;

FIG. 14 depicts a Table 9 listing the structure of PATH and NO_PATH messages for link failures;

FIG. 15 depicts a Table 10 listing routing variables used in a routing update mechanism;

FIG. 16 depicts a Table 11 listing the processing steps of a procedure Routing_Update ( ) employed in the routing update mechanism;

FIG. 17 depicts a Table 12 listing the processing steps of a procedure Assem_Status (TOP_MSG) employed for assembling a topology message;

FIG. 18 depicts a Table 13 listing the processing steps of a procedure Flood_Routing (pkt, link) for broadcasting network topology update information to member nodes of the network;

FIG. 19 depicts a Table 14 listing the structure of the network topology database;

FIG. 20 depicts a Table 15 listing the processing steps of a procedure Update_Top_Tables ( ) for updating the network topology database;

FIG. 21 depicts a Table 16 listing the processing steps of a procedure Assign_New_VC (j, link_in, ckt_in, c) for assigning a new virtual circuit in response to VC_REQ;

FIG. 22 depicts a Table 17 listing the processing steps of a procedure Complete_New_VC (j, c, link, ckt) for completing VC assignment on receipt of VC_RSP;

FIG. 23 depicts a Table 18 listing the processing steps of a procedure Reassign_$\zeta$(j) for reassigning datagram routing variables for destination j;

FIG. 24 depicts a Table 19 listing the processing steps of a procedure Handle_VC_REJ (link_out, ckt_out, c) for responding to VC_REJ;

FIG. 25 depicts a Table 20 listing the processing steps of a procedure Disc_VC (link, ckt, direction) for disconnecting a VC on receipt of VC_FIN;

FIG. 26 depicts a Table 21 listing the processing steps of a procedure Adjust_VC ( ) for adjusting virtual circuit assignments; and FIG. 27 depicts a Table 22 listing the processing steps of a procedure Reassign_DG ( ) for reassignment of all datagram routing variables.

DETAILED DESCRIPTION

Figure 1:
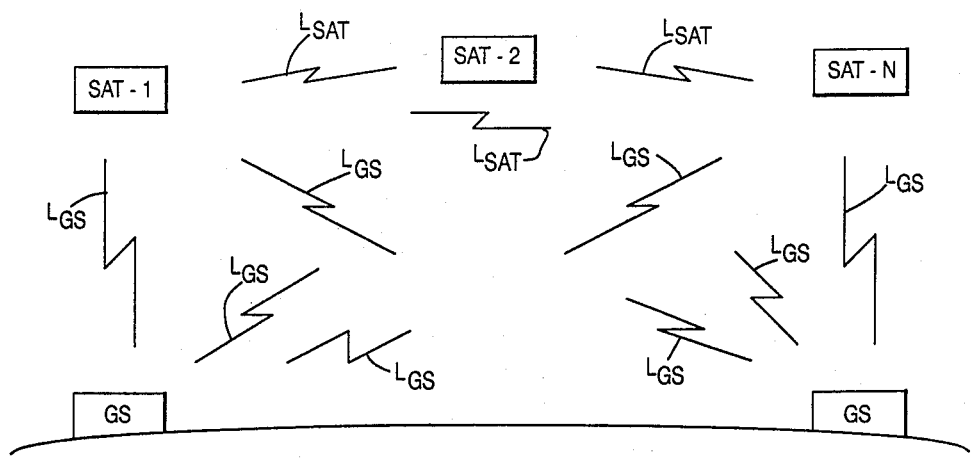
FIG. 1 diagrammatically illustrates a multinode satellite communications network comprised of a plurality of communications satellites interlinked with one another and with a plurality of associated ground stations.

Before describing in detail the particular improved network management/routing scheme in accordance with the present invention, it should be observed that the present invention resides primarily in a novel routing mechanism for controlling the connectivity of the member nodes of a communication network employing conventional communications circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

For purposes of providing an illustrative example, in the description to follow, the communications environment to which the present invention is applied is assumed to be a satellite communications system comprised of a plurality of communications satellites interlinked with one another and with a plurality of associated ground stations. However, it should be realized that the invention is not limited to use with this particular network or to satellite communications systems only, but is applicable to any multinode network in which communications between source and destination nodes may take place over multiple routes through the nodes of the network. It should also be observed that the network topology can be either dynamic (network topology changes with time) or static (network is effectively time invariant).

As pointed out above, the present invention is particularly advantageous when incorporated in a communications network where its topology is dynamic (e.g. multiple moving vehicle (aircraft, spacecraft, ships and land vehicles) where participants (member nodes), distances between nodes and links between nodes may vary with time and, consequently, require a network routing mechanism that is capable of effectively tracking, in real time, changes in network topology, and does not require long periods of time (a multiple iteration convergence procedure, as in the above-referenced Gallager technique) to accomplish near optimal routing of data communications traffic among member nodes.

In the satellite communications system diagrammatically illustrated in FIG. 1, a plurality of geographically distributed terrestrial (ground) stations GS communicate with one another by means of a multiplicity of communication satellites SAT via respective ground-to-satellite (or satellite-to-ground) communication paths or links $L_{GS}$ and satellite-to-satellite communication links $L_{SAT}$. Namely, the ground stations GS and the satellites SAT correspond to the network nodes which are linked to one another via transmission paths $L_{GS}$ and $L_{SAT}$. Each node (whether it be a ground station GS or a communications satellite SAT) contains conventional transceiver, tracking and acquisition and signal processing equipment shown in block diagram form in FIG. 2.

Figure 2:
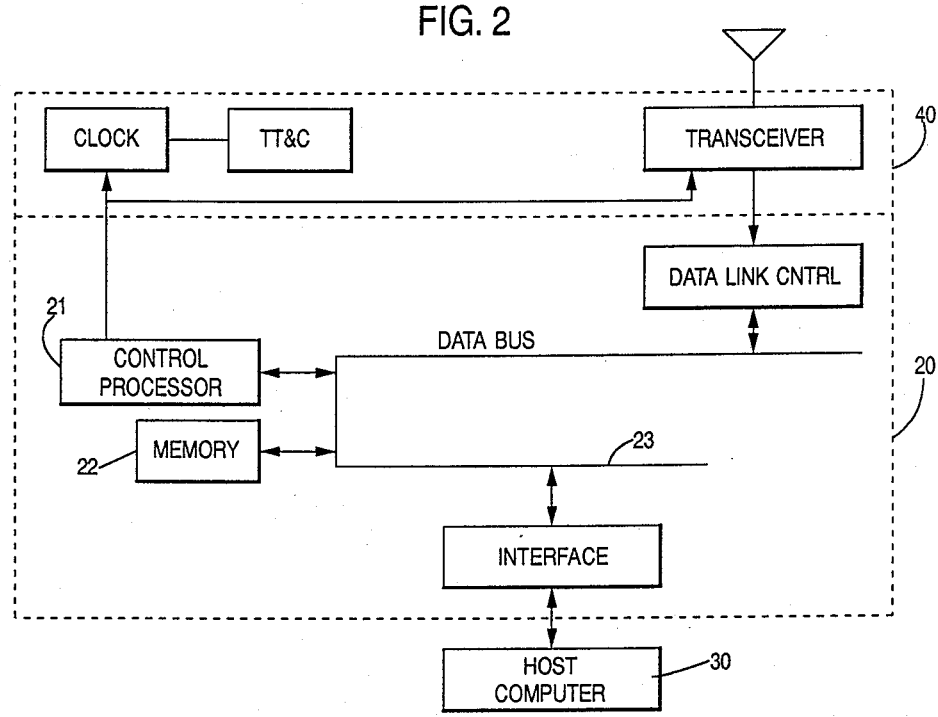
FIG. 2 is a block diagram illustration of the communications and signal processing equipment employed at an individual node (whether it be a ground station GS or a communications satellite SAT) of the communications network shown in FIG. 1.

More particularly FIG. 2 illustrates a typical node block diagram the central element of which is a packet switch 20 within which the routing mechanism is implemented. Coupled with communications bus 23 of packet switch 20 (via interface unit 24) is a host computer system 30 which executes user processes and is the source and destination of all user data. The packet switch either delivers data packets to the host computer or it relays the packet to another node. Packet communication is typically effected by using a set of layered protocols similar to the seven-layer International Standards Organization (ISO) reference model of Open System Interconnection (OSI), Data link control is illustrated in FIG. 2 as a low-level function of layer 2 of the ISO reference model and serves to provide error-free transmission of packets. The data link control may be implemented using a standard synchronous data link communication protocol. For a more detailed explanation of this seven layer model, as well as a number of standard protocols that may be employed in accordance with the present invention attention may be directed to the textbook "Computer Networks" by Andrew S. Tanenbaum, Prentiss-Hall, Inc. 1981.

The basic control element within packet switch 20 is a general purpose computer referenced in the Figure as control processor 21. Control processor 21 is primarily responsible for executing the network layer (layer 3) protocols. The network layer is the layer in which the packet routes are determined. The adaptive routing mechanism described below is executed by control processor 21.

Associated with control processor 21 is a random access memory 22 in which packet buffers, control software and routing tables reside. Memory 22 provides temporary storage for packets while control processor 21 is deciding whether to deliver a packet to host computer 30 or to forward the packet to another node. The decision is based upon the address in the packet header. As will be explained in detail below, the data link to be used for forwarding a packet to another node is selected by looking up the best route in the routing table (updated periodically and in the event of a link failure) for the destination address in question.

In addition to the control mechanism FIG. 2 also shows conventional satellite communications equipment, which makes up the physical layer (layer 1) of the node, in the form of a transceiver unit 40 that contains transmitter, receiver, modulator and demodulator units and TT&C (tracking, telemetry and control) units interfaced with the packet switch through conventional data link control components. As the details of the configuration and operation of such equipment are unnecessary for gaining an understanding of the present invention they will not be described here. Instead, attention may be directed to standard communication texts such as "Digital Communications by Satellite" by J. J. Spilker, Prentice-Hall, 1977. Carrier and bit synchronization may be effected using conventional mechanisms using phase-locked loops as described in an article entitled "Carrier and Bit Synchronization in Data Communication—A Tutorial Review" by L. E. Franks, IEEE Transactions on Communications, Vol. COM-28, August 1980, pp. 1107–1121. Precise timing of node operation may be implemented using techniques described in the articles "Network Timing/Synchronization for Defense Communications" by H. A. Stover, pp. 1234–1244 and in the paper entitled "Synchronization of a Digital Network" by J. Heymen et al pp. 1285–1290, IEEE Transactions on Communications, Vol. COM-28, August 1980.

It should be observed that in the description to follow routing updates occur in a (loosely) synchronized fashion; however, the mechanism of the invention is also applicable using asynchronous updates which would require no network timing. Such an asynchronous application of the invention allows nodes to issue topology updates asynchronously to each other as in the above-referenced ARPANET routing scheme. A minor drawback to this method, however, is the fact that, as in the ARPANET technique, transient routing loops can occur.

Figure 3:
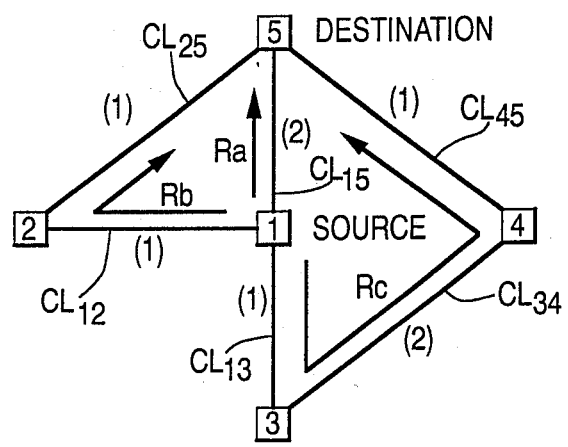
FIG. 3 is a two-dimensional topology diagram of an exemplary multinode communication network.

In order to facilitate an appreciation of the network management/routing mechanism of the present invention, it is useful to examine the topology of a typical multinode communication network, such as a satellite communication system, referenced above, using an exemplary two-dimension topology diagram, such as that depicted in FIG. 3. It should be noted, however, that the topology of the network to which the present invention may be applied is not limited to the example given or to only two dimensional topologies. In fact, in a practical environment, such as an airborne/spaceborne communications network, it can be expected that the topology will be three dimensional and will contain considerably more nodes than the network shown in FIG. 3. The two dimensional illustration of FIG. 3 is employed merely for reducing the complexity of the description.

More particularly, FIG. 3 diagrammatically depicts the topology of a five member station or node network comprising nodes 1, 2, 3, 4 and 5, one of which (node 1) is referenced as a source node (S) from which a message to be transmitted originates and another of which (node 5) is referenced as a destination node (for whom the message from the source node 1 is intended). The nodes of the network topology of FIG. 3 are shown as being linked by a plurality of communication links CL over which messages are conveyed. In the present example of the transmission of a message from source node 1 to destination node 5, the communication links that may be used for transmitting messages are denoted by subscripts (i,k), the first of which (i) corresponds to the node from which the link extends to another node and the second of which (k) corresponds to that another node to which the link extends. Thus, for example, communication link $CL_{12}$ is a communication link (CL) extending from node 1 to node 2.

Associated with each communication link $CL_{ik}$ is a link metric $D_{ik}$ which is representative of the degree of 'goodness' of the link between adjacent nodes i and k and is based upon a number of communication capability criteria, including link delay, data rate, congestion and link capacity. Typically, the congestion (in packets per second) on a link (i,k) increases with increase in data rate $f_{ik}$ (packets per second) and decreases with an increase in capacity $C_{ik}$ (packets per second). These effects are incorporated into a link metric $D_{ik}(f_{ik})$, which is repeatedly (periodically) updated at each node and propagated to all other nodes of the network using a constrained flooding mechanism, so that each node may be advised of the states of all other nodes of the network. This flooding mechanism is the so-called topology update function, which is implemented by the same conventional technique used in the above referenced ARPANET system. A typical link metric for link (i,k) is of the form $$T_{ik}(a, f_{ik}) = ad_{ik}/C_{ik} + 1/(C_{ik} - f_{ik}),$$

where the first term denotes the normalized propagation plus processing delay and the second term is the expected transmission delay including the queuing delay. The propagation delay normalization makes the propagation delay and congestion terms nominally the same order of magnitude at low loads. The term $d_{ik}/C_{ik}$ is the actual propagation delay (in seconds). Therefore, $d_{ik}$ is the value of propagation delay as measured in number of packets in the pipeline between nodes. The asymptotic behavior of the second term for large flows tends to introduce instability. Upon investigation it has been determined that a preferred definition of the link metric $D_{ik}(a, f_{ik})$ is:

$$D_{ik}(a, f_{ik}) = \begin{cases} T_{ik}(a, f_{ik}), & f_{ik} < F_{ik}, \\ T_{ik}(a, F_{ik}) + (f_{ik} - F_{ik})/(C_{ik} - F_{ik})^2, & f_{ik} \geq F_{ik} \end{cases}$$

where $F_{ik} = bC_{ik}$, and b is a scale factor less than one. This constrains the maximum value of $D_{ik}(f_{ik})$ to a relatively small value so that instability is not a problem.

For purposes of generating the link metric any conventional mechanism may be employed, such as measuring the average traffic transmitted on a link and performing the above calculation. It should be observed, however, that the routing mechanism of the present invention does not require the use of this or any other particular mechanism for generating the link metric.

Pursuant to the network management/routing mechanism of the present invention the source node uses the link metric updates, as periodically supplied from the other nodes of the network, to determine which potential communication routes that contain links extending from the source node and terminating at the destination node pass through neighbor nodes that are effectively closer to the destination node than the source node. For this purpose, the communications control processor at each node $N_i$ maintains (in memory) a shortest path metric table that contains a list of the metrics of all shortest possible paths between that node $N_i$ and all potential destination nodes. Using the set of link metrics accumulated through topology updates, any (source) node desiring to transmit a message to another (destination) node may construct a similar table of shortest path metric sums from each neighbor node, each of which totals to a value less than the value of the shortest path metric from that source node to the destination node. This sum set effectively represents a set of 'feasible' communication routes through the network from the source node to the destination node.

Using the network topology of the present example illustrated in FIG. 3 (wherein link metric values of the network links are indicated parenthetically), with node 1 as the source node, those neighbor nodes which lie closer to the destination node 5 than does node 1, i.e. lie on a link whose link metric is less than that of the link between source node 1 and destination node 5 (a value of 2 in the illustrated topology), are the destination node 5 itself (link metric value of zero) and node 2 (link metric value of 1).

Routes R which originate at source node 1 and terminate at destination node 5 and include such "closer lying" neighbor nodes are designated as 'feasible' routes. In the present example, these 'feasible' routes are the route Ra (from source node 1 directly to destination node 5) and route Rb (from source node 1-to-neighbor node 2-to-destination node 5). It is to be noted that although node 3 is a neighbor node, it lies farther away from (i.e. is not closer to) destination node 5 than source node 1 and, therefore, any route between source node 1 and destination node 5 that passes through node 3 (here route Rc) is excluded from consideration as a 'feasible' route. As a consequence of this "must lie closer" requirement, each potential route will contain no loop (back to the source node).

Figure 4A:
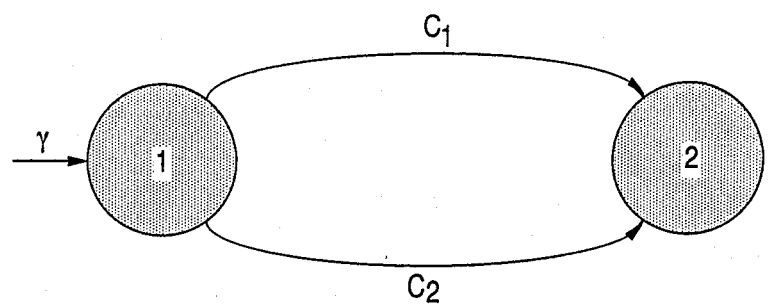
FIG. 4A diagrammatically illustrates a two-node network.

For purposes of enabling the control processor at each node to carry out the above-described 'feasible' route selection procedure with respect to $L_i$ neighbor nodes $m_1, m_2, \ldots, m_{L_i}$, the manner in which the network topology variables are processed may be expressed in accordance with the procedure set forth in Table 1, shown in FIG. 4.

From Table 1 it can be seen that the routing procedure is autonomous in that each node determines a set of routing tables with no inputs from other nodes (except globally available link metric information received during the topology update flooding interval).

Thus, in the exemplary network topology shown in FIG. 3, for node 1 there are three neighbor nodes (2, 3 and 5). The initial step in the feasible route selection procedure is to generate a shortest path spanning tree, rooted at node 1, to all destinations and similar trees from each neighbor of node 1. Each such calculation is accomplished by the procedure Shortest_Path ($m_k$, D, $M_{mk}$, $P_{mk}$, $\rho_{mk}$, $C_{min}$), which is preferably implemented using a conventional spanning tree algorithm, such as Dijkstra's algorithm, described in an article entitled "A note on two problems in connection with graphs", Numerical Math. Vol. 1, 1959, pp. 262-271. Using the periodically updated link metric array D and the node index as inputs, the Shortest_Path algorithm generates an output array $M_i$ which contains the minimum metric $M_i^j$, to each destination node j in the shortest path spanning tree from the root node (not to be confused with a minimum weight spanning tree). The propagation delay to each destination is returned in the array $P_i$. The propagation delay of link (i, $m_k$) is denoted by $D2_{imk}$. This procedure also determines the link with maximum utilization (called the bottleneck link) and the link with minimum capacity along the shortest path to each destination. These are denoted by $\rho_i$ and $C_{min}^i$, respectively. These shortest path calculations are first calculated using node i as the root and then each of its neighbors as the root. From this the set of feasible routes can be determined.

In the present example, therefore, for node 1 and its neighbor nodes 2, 3 and 5, (and ignoring the path metrics to destination nodes other than node 5) the following path metrics to destination node 5 will be produced: $M_1^5 = 2$ for node 1 as a root node, $M_2^5 = 1$, for node 2 as a root node, $M_3^5 = 3$ for node 3 as a root node and $M_5^5 = 0$ for node 5 as a root node. From these values, a set of indices $S_i^j$ into the set of $L_i$ neighbors of node i = 1 which lie on the feasible routes to destination node j = 5 is determined by requiring that $M_i{}^j > M_{m_k}{}^j$. This condition states that only neighbor nodes closer to the destination node j (here node 5) than node i (node 1) are permitted to lie on 'feasible' routes. The sequence of calculations to make this decision is carried out inside the nested-for loops (iterated on j and k). The metric $M_{m_k}{}^j$ is the minimum path metric to the destination node j=5 and is located by the application of the shortest path algorithm to find a tree rooted at the neighbor node $m_k$ (Shortest_Path ($m_k$, D, $M_{m_k}$)).

Thus, in the present example, the set of indices $S_i{}^j$ will exclude neighbor node 3 which lies farther away from destination node 5 than does node 1. Consequently, route Rc is not considered to be a 'feasible' route, leaving only route Ra (which extends directly from source node 1 to destination node 5) and route Rb (which extends from source node 1 to node 2, and from node 2 to destination node 5) as 'feasible' routes.

As described above, in addition to determining feasible routes for the transmission of traffic between a source and destination node based upon updated path metric array tables maintained at each node, the network management/routing mechanism according to the present invention also uses these path metric arrays to allocate the use of the routes to near-optimally balance the loading of the network. To this end, for each feasible route a routing variable $\phi_{ik}{}^j$ is used to define what fraction of the traffic is to be routed over that feasible route. In effect the routing variable represents the probability that traffic at node i destined for node j will be routed through neighbor node k. From Table 1, the metric for a feasible path routed through node $m_k$ is $$w_{im_k}{}^j = D_{im_k}(a, f_{im_k}) + M_{m_k}{}^j,$$

where $D_{im_k}(a, f_{im_k})$ is the link metric for link (i,$m_k$). The minimum path metric $M_i{}^j$ from source node i to destination node j is $$M_i{}^j = \min_{1 \leq k \leq L_i} w_{im_k}{}^j.$$

In accordance with the feasible path allocation mechanism of the present invention routing variables $\phi_{im_k}{}^j > 0$ are assigned to each of the feasible routes such that $$\sum_{k=1}^{n} \phi_{im_k}{}^j = 1$$

and the routing variables for all non-feasible routes are zero, thereby guaranteeing loop-free routes. These requirements are representable by the sequence:

for j=1 to n (j≠i)

for $j = 1$ to $n$ ($j \neq i$)

$\phi_i{}^j = f(S_i{}^j, M_i{}^j, w_i{}^j);$
        (Heuristic assignment of routing variables)

The heuristic employed for assigning values to $\phi_{ik}{}^j$ is premised on the apportionment of traffic among feasible routes inversely with the magnitude of the path metric for each route.

More particularly, letting $$w_i{}^j = (w_{im_1}{}^j, w_{im_2}{}^j, \ldots, w_{im_{L_i}}{}^j),$$

when $w_i{}^j$ can be mapped into the routing variables $\phi_{im_k}{}^j$'s, i.e.

$$\phi_i{}^j = f(S_i{}^j, M_i{}^j, w_i{}^j),$$

where $$\phi_i{}^j = (\phi_{im_1}{}^j, \phi_{im_2}{}^j, \ldots, \phi_{im_{L_i}}{}^j)$$

Then, $\phi$ can be written as:

$$\phi_{im_k}{}^j = \begin{cases} g(k, S_i{}^j, w_i{}^j), & k \in S_i{}^j, \\ 0, & k \notin S_i{}^j. \end{cases}$$

As an example, the function $g(k, S_i{}^j, w_i{}^j)$ may be defined as $$g(k, S_i{}^j, w_i{}^j) = (1/w_{iL_{m_k}}{}^j) / \left( \sum_{k \in S_i{}^j} 1/w_{iL_{m_k}}{}^j \right).$$

This function maps all n routing variables into positive numbers which sum to 1 and the relative values vary inversely with the size of the path metric.

In addition, the f estimates are averaged to improve stability. When new feasible routes are determined in accordance with the procedure set forth in Table 1 widespread changes in routes can occur if there are significant changes in path metrics. In situations where the minimum metric to destination j from the source node i is nearly equal to the minimum metric of one of its neighbors, the above expression for $g(k, S_i{}^j, w_i{}^j)$ can contribute to instability. In this instance stability can be improved by driving the routing variable to zero. This is accomplished by making the routing variable proportional to $(M_i{}^j - M_{m_k}{}^j)^{\frac{1}{2}}$. Investigation has shown that the excellent behavior of the route allocation procedure can be obtained by defining the expression $g(k, S_i{}^j, W_i{}^j)$ as $$g(k, S_i{}^j, W_i{}^j) = (W_{im_k}^j) / \left( \sum_{k \in S_i{}^j} W_{im_k}^j \right),$$

where $$W_{im_k}^j = (M_i^j - M_{m_k}^j)^{1/2} / (w_{m_k}^j + \delta[w_{m_k}^j(0)]^2 / w_0),$$

where $$w_0 = 1/|S_i{}^j| \sum_{k \in S_i{}^j} w_{m_k}^j(0).$$

The expression $w_{m_k}{}^j(0)$ refers to the path metric at zero flow. The constant $\delta$ allows a trade-off between low-load and high-load performance with larger values emphasizing low-loads.

As pointed out above each node carries out a link metric calculation based upon traffic flow measurements conducted on the links with which that particular node is associated. In order to provide processing stability the traffic flow values are preferably averaged over several update intervals. If $f_{ik}$ is the average flow since the last update, then this sample is averaged with previous measurements, namely a running accumulation is obtained as $$f_{ik} = \alpha f_{ik} + (1-\alpha) f_{ik}.$$

Thus, each new flow measurement value $f_{ik}$ produces a new updated average value. The time constant of this first order filter function may be on the order of several update intervals (e.g. $\alpha \approx 0.2$). Then having computed the value $f_{ik}$, node k can determine the new metric for each of its neighbor nodes i, and broadcast these updated metrics to all nodes of the network on the next topology update.

In order to provide improved performance with respect to the mapping scheme described above, a two-stage heuristic mapping function to be described below may be employed. Specifically, this two-stage approach provides near-optimum performance when propagation delays become large. As a simple example consider the two-node network shown in FIG. 4A. This optimum solution as a function of load is to place all traffic on the low-delay link until the utilization of this link exceeds $p_{break}$ at which point sharing with the alternative path should begin. Assume that the zero-flow delay (in seconds) of the minimum delay link is $p_1 + 1/C_1$ while the corresponding delay for the other link is $p_2 + 1/C_2$. (The term $p_1$ denotes the propagation delay in the link.) The expression for $p_{break}$ is $$p_{break} = 1 - \frac{1}{C_1(p_2 + 1/C_2 - p_1)}$$

This will be applied as a heuristic to the general case where there are multiple paths each consisting of several links. The term $C_1(p_2 + 1/C_2 - p_1)$ will be replaced by $C_{min}(t_2 - p_{min})$. The capacity, $C_{min}$, refers to the capacity on the link with minimum capacity along the path of minimum delay at zero flow, and $p_{min}$ refers to the propagation delay on this path. The term $t_2$ refers to the actual delay (propagation plus transmission) at zero flow on the second smallest delay path.

The two-stage mapping function generates a pair of partial routing variables in the first stage, one based on the zero-flow metric and the other based on the part of the metric that reflects the transmission plus queueing delay which is denoted by queueing. Use of the zero-flow metric will dominate at low loads. In fact, it will be used exclusively below a certain threshold. The two-node example described above will provide the heuristic for decisions to $p_{break}$. The procedure Route_Var () specified below in Table 1A (FIG. 4B) defines this heuristic method for mapping the metrics into the routing variables. The following development of the rationale and equations used in Table 1A illustrates the heuristic.

Feasible paths will be determined as described above using the conventional link metrics, $D_{ik}(\alpha, f_{ik})$, in calculating the path metrics, so that all nodes will use the same link metrics in making these decisions. It is important to note that these metrics are a linear combination of the metrics used in calculating the two sets of partial routing variables. A separate pair of path metrics is calculated for each feasible path to determine the routing variables. The first is the zero-flow path metric, $w_{\sigma imk}^j$, which is calculated by summing the zero-flow link delay, $D_{ik}(i,0)$, for each link along the path. (This is obtained from the metric_zero field of the topology update packet.) Since it is very important to let the shortest delay dominate at low loads, the routing variables will be inversely proportional to the square of this metric, i.e.

$$W_{\sigma imk}^j = \frac{(M^j - M_{mk}^j)^{1/2}}{(w_{\sigma imk}^j)^2},$$

where $M^j$ is calculated as before using $D_{imk}(\alpha, f_{imk})$. Similarly, the queueing path metric, $W_{qimk}^j$, is calculated by summing the queueing link metric, $D_{ik}(0, f_{ik})$, for each link along the path. (This is obtained from the metric_queue field of the topology update packet.) This metric will dominate at high loads and the routing variables will be inversely proportional to it i.e., $$W_{qimk}^j = \frac{(M^j - M_{mk}^j)^{\frac{1}{2}}}{W_{qimk}^j}.$$

These weighting factors are used to calculate the zero-flow routing variables $\phi_{0imk}^j$, by using $W_{\sigma imk}^j$ in $$g(k, S_i^j, W_i^j) = \frac{W_{imk}^j}{\sum_{k \in S_i^j} W_{imk}^j},$$

and then substituting this result in the definition of $\phi_{imk}^j$. The queueing routing variable, $\phi_{qimk}^j$, is computed by using $W_{qimk}^j$ and then determining $\phi_{imk}^j$.

These routing variables provide near-optimum solutions at low loads and at high loads, respectively. By averaging these two routing variables near-optimum performance at intermediate loads can be achieved. This averaging is done using a heuristic to compute the actual routing variables used in routing tables as $$\phi_{imk}^j = [1 - \eta^j(\rho_{bot}^j)]\phi_{0imk}^j + \eta^j(\rho_{bot}^j)\phi_{qimk}^j.$$

to simplify the subsequent notation the subscript i identifying the node computing its routing variables has been dropped from $\eta^j(\rho)$, $\rho_{crit}^j$ and $\rho_{break}^j$. The averaging function is $\eta_j(\rho)$ is intended to approach 1 at high loads to utilize only the queueing metric and to approach 0 at low loads to utilize only the zero-load metric. In fact, for a significant imbalance in the propagation delay, $\eta^j = 0$ until relatively high loads for the two-node example. Thus, $$\eta^j(\rho) = \begin{cases} 0, & \rho \geq \rho_{crit}^j, \\ \frac{\rho - \rho_{crit}^j}{1 - \rho_{crit}^j}, & \rho_{crit}^j < \rho \leq 1, \end{cases}$$

where $$\rho_{crit}^j = \min[0.8, \rho_{break}^j].$$

Some further explanation is required to fully define how this heuristic is used. The function $\rho_{crit}^j$ is computed for destination j from the set of feasible paths to j. The parameter $\rho_{break}^j$ is calculated using the zero-flow delays of the set of feasible paths to calculate $$t_{min} = \min_{k \in S_i^j} [W^j_{\sigma imk}]$$

and $$t_{max} = \max_{k \in S_i^j} [w^j_{\sigma imk}].$$

This provides the zero-flow delays of the minimum and maximum delay paths. The parameter, $C_{min}$, is the capacity of the link with minimum capacity along the feasible path to destination j with minimum delay $t_{min}$. The value of $\rho_{bot}{}^j{}_i$ is equal to the largest utilization of any link along each of the feasible paths to destination j, i.e., it is the utilization of the bottleneck link. The value used is the output of a simple first-order filter which has as its input the currently measured value of the bottleneck utilization, i.e.

$$\rho^j_{bot\ i} = \alpha(\bar{p})\ \rho^j_{bot\ i} + [1 - \alpha(\bar{p})]\bar{p}_{bot\ i}.$$

It should be noted that the filter parameter is the same self-scaling parameter used for the link flows.

The function $\eta^j(\rho)$ insures that only the zero-flow routing variables are used whenever the utilization on the bottleneck link is less than $\rho_{crit}{}^j$. This forces almost all of the load onto the low delay path which is correct. The function $\rho_{crit}{}^j$ is saturated at 0.8, because if it were allowed to increase beyond this, the slope of $\eta^j(\rho)$ at larger values of $\rho$ would begin to cause stability problems. The function $\eta^j(\rho)$ forces the use of the queueing variables, $\phi_{qimk}{}^j$, when any link on any feasible path becomes a bottleneck (which is the correct action). It should also be noted that this function in computed separately for each destination, so that a bottleneck is one part of the network may force a local use of queuing variables there, while in places where there are no bottlenecks the zero-flow variables can be used.

As described above, the path metric table within each node is updated periodically by a network-wide flood mechanism, so that each node will possess a current picture of the connectivity and traffic congestion on the network links. Using its path metric table each node generates a routing table for each destination and an attendant routing variable table associated with each set of feasible paths in accordance with the routing and traffic allocation mechanisms thus far described. For the most part, these tables remain intact until the next topology update. However, in accordance with a further aspect of the present invention, in the event of a connectivity failure (either on a link or at a node) within the network, the routing mechanism does not wait until the next topology update but, instead, takes immediate action to make whatever adjustments to the presently employed routine scheme are necessary, so as to insure that the transmission of traffic through the network, is, at all times, effectively nearly optimally routed.

More particularly, incorporated into the routing mechanism is an 'event-driven' failure recovery procedure which reassigns the routing of traffic from a source node to a destination node by coordinating with other nodes in the rerouting process. In the exemplary network topology diagram of FIG. 3 the routing of traffic from source node 1 to destination node 5 is allocated between feasible routes Ra and Rb (using the routing variable $\phi_{ik}{}^j$ to apportion the traffic between each route). In the event of a failure on either of these routes the most straightforward way to reroute the traffic is to simply transmit all of the traffic over the remaining route. (In a network topology where there is more than one remaining feasible route, the traffic is reapportioned over those routes using updated routing variables.) Should the failure effectively negate all currently employed feasible routes (or route, where only one path is being used), so that no alternate route is currently available, a distributed reassignment procedure is implemented which finds a nearby alternate feasible route to which traffic can be rerouted.

In accordance with the invention, when a node detects a failure it transmits a message (referenced here as a NO_PATH type message to be described in detail below) to its neighbor nodes identifying those destinations which can no longer be reached by feasible paths through it. In the simplest case one of the neighbor nodes will send back a message to the failure detecting node indicating that the neighbor has another feasible path for these destinations and that all traffic to these destinations may be sent through that neighbor node. Any node which receives this message will propagate the message if, as a result of the message, that neighbor node no longer has a feasible route to the destination. The propagation of the message terminates at nodes which have alternative feasible routes to the destination.

A second type of message (termed a PATH message, to be described below) is used to inform a node having no feasible route to a destination that a feasible route to the destination is available through the node sending the PATH message. Any node which receives a PATH message and which has no feasible route to the destination will reroute such traffic to the node sending the PATH message and will propagate the PATH message. The PATH message will continue to propagate to all nodes which cannot provide a feasible path to the destination. This procedure will ultimately result in loop-free rerouting without having to wait for the global topology update.

Figure 5:
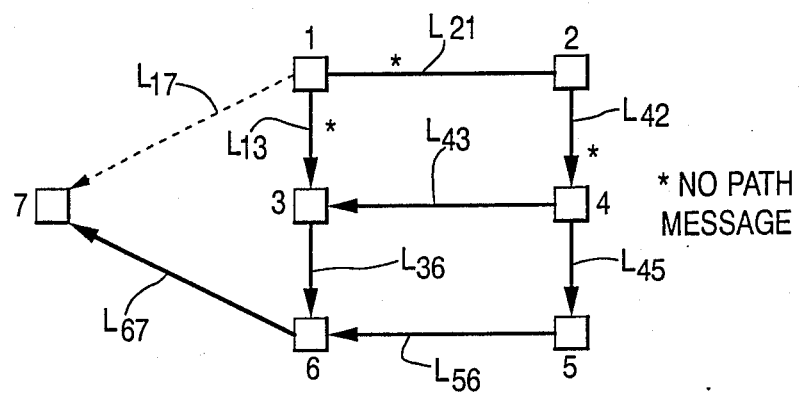
FIG. 5 depicts a seven node network topology in which a failure has occurred on the link between nodes one and seven, (feasible paths to destination node 7 indicated by directed links)

To facilitate an understanding of the event-driven failure recovery procedure outline briefly above, attention is directed to the seven node network topology diagrammatically illustrated in FIG. 5. In the present example, for purposes of simplification, the routing of traffic (indicated by the directions of the arrows linking the nodes of the network) to destination node 7 only will be considered. In the topology of FIG. 5 a link failure has occurred on link $L_{17}$ and is detected by node 1. Upon detection of the failure node 1 initiates the execution of the event-driven failure recovery routine set forth in Table 2, shown in FIG. 6.

The first action taken in response to the detection of the failure (LNK_FAIL (link)) is the call to the routine Unreach_Nodes (NO_PATH, link), set forth below in Table 3, shown in FIG. 7, where 'link' is the index of the link that has failed (here link $L_{17}$).

The purpose of the routine set forth in Table 3 is to first locate local alternate paths for all traffic passing over the route containing the 'link' index. As mentioned previously, the allocation of traffic to an alternate feasible route is a relatively simple matter when, in fact, an alternate route already exists locally. In the present example of the topology of FIG. 5, however, there is no alternate feasible route, all of the traffic from node 1 being transmitted directly from node 1 to destination node 7 and, moreover, node 1 finds that it is receiving traffic from nodes 2 and 3 destined for node 7. Consequently, it is necessary to execute the routine NO_PATH, in which a message is transmitted from node 1 to all neighbor nodes (here nodes 2 and 3) identifying those destinations which can no longer be reached via a feasible route through node 1.

In Table 3, if the variable Old_Tables, which indicates whether or not this routine was called in the interval between the occurrence of the failure and the update of the routing tables, is true, the effect of the link failure is examined twice: first, upon the occurrence of the failure and, second, after the new routing tables have been installed. (In the first 'If' statement of Table 3, the link index is stored in the set Failed_Links for later inspection after the new routing tables are installed, scheduled as new events by the routine Resched_Events (Failed_Links) in Table 11, shown in FIG. 16 to be described below.)

Next, all destinations are examined in order to locate nodes that have become unreachable as a result of the failure. A list of these unreachable nodes is maintained in UR_NODES. If the node 7 ('dest') was not reachable before the occurrence of the failure and if the 'link' (here link $L_{17}$) actually carried traffic to the destination node, which, in the present example, it did, then $\phi_{imlink}^{dest}$ indicates that a local alternate feasible path can be used for rerouting traffic. The routine Rescale_$\phi$ (i, dest, link) rescales the routing variables proportionately in order to optimize the load; otherwise node 7 ('dest') is added to the list of unreachable nodes and to the NO_PATH message packet. After examining all destination nodes, a NO_PATH data packet is transmitted on all links if the failure has caused new nodes to become unreachable.

In the present example, each of nodes 2 and 3 receives a message from node 1 that node 1 no longer has a feasible route to destination node 7. On receiving this message, node 2 reacts as though its link $L_{21}$ (the only link from node 2 within a feasible route to node 7) has suddenly become useless for the transmission of traffic to node 7, and node 2 proceeds to send a similar message to node 4. As mentioned previously, a node which receives a NO_PATH message (here nodes 3 and 4) will propagate the message if, as a result of the message, that node no longer has a feasible route to the destination node. Otherwise, the propagation of the NO_PATH message terminates at nodes which have alternate feasible routes to the destination (each of nodes 3 and 4 in the present example).

More specifically, the steps of routine New_Unreach_Nodes ( ), Table 4, FIG. 8, is executed at a node (here nodes 3 and 4) which has been informed of the loss of path through the reception of a NO_PATH message. The node receiving the message examines only those destination nodes listed in the message as being unreachable.

In this routine the sequence number is tested to determine if the original failure event (here the failure of link $L_{17}$) occurred when Old_Tables was true and if Old_Tables is still TRUE. Otherwise new tables may have been installed that obviate the need to respond to the failure. $\phi_{imlink}^{dest}$ is tested to determine if a local alternate path is available, and local traffic will be rerouted if such a path is available. If no alternative route is available then a NO_PATH message (indicated by S_NO_PATH) is transmitted on all links except for the one on which the original NO_PATH message was received.

In the present example, it will be recalled that each of nodes 3 and 4 have received the same NO_PATH message *from node 2 and that node 4, like node 3, will have found that it has an alternate feasible route to the destination node 7, thereby allowing node 2 to send its traffic over link $L_{24}$* to node 4. Accordingly, each of nodes 3 and 4 will transmit a PATH message indicating that traffic intended for the destination node 7 can be sent through this node (i.e. node 3 and node 4). In other words, a PATH message is used to inform a node (here each of nodes 1 and 2) with no feasible route to a destination that a feasible route to the destination is available through the node sending the PATH message. All nodes which have no feasible route to the destination and receive the PATH message will reroute traffic to the node sending the message and will propagate the message. The PATH message will continue to propagate through the network until it reaches the source of the NO_PATH message. The routine for responding to a PATH message is set forth in Table 5, shown in FIG. 10

This routine, termed New_Reach_Nodes (PATH, link) examines the PATH message for a list of destination nodes that can be reached by directing traffic through the node identified by the link index. Provided that the destination node (here node 7) is currently unreachable and the appropriate conditions on sequence numbers are satisfied, $\phi_{ik}^j$ is set to 1. Also the destination node is removed from the list of currently unreachable nodes, and is added instead to the list of reachable nodes in the PATH message to be propagated.

Figure 9:
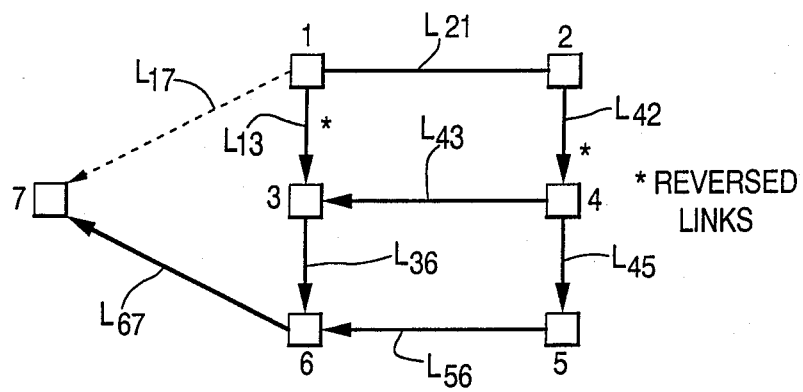
FIG. 9 depicts the seven node network topology of FIG. 5 rerouted in accordance with the Event-Driven Failure Recovery Procedure listed in Table 2, (new feasible paths to destination node 7 indicated by directed links)

FIG. 9 depicts the manner in which the network routing scheme of FIG. 5 is reconfigured by the execution of the above routines. As shown therein the original (failed) link $L_{17}$ between nodes 1 and 7 is no longer used and the directions of the links between nodes 1 and 3 and between nodes 2 and 4 have been reversed. In order to simplify the rerouting mechanism, the new path assignment routine selects only a single new path at each node which, as a result of the failure, had no feasible route through it.

Pursuant to the invention, in both the original routing mechanism and the event-driven failure recover mechanism described above, where more than one feasible path is utilized to send traffic to a destination node the traffic is apportioned in accordance with a routing variable derived on the basis of the path metric tables maintained at each of the nodes. In the rerouting Tables set forth above apportionment of the traffic is determined in accordance with the subroutine identified as Rescale $\phi$ (i, dest, link).

In accordance with this rescale procedure if traffic intended for the destination node (dest) is allowed to propagate on 'link', then $\phi_{alt}$ represents the fraction of that traffic which is transmitted by the feasible routes that do not include 'link'. Then each routing variable is simply normalized by $\phi_{alt}$ and $\phi_{ik}^j$ is set to 0. Consequently, local alternate rerouting is accomplished.

As described above, each of the nodes of the network topology into which the routing mechanism of the present invention is incorporated maintains a set of tables (e.g. path metrics, routing variables, node status) that enable each node to keep track of changing conditions within the network in the course of its monitoring of link connectivity and its transmission of messages to other nodes of the network. For purposes of systematic coordination of the conditions at each of the nodes of the network, table entries are updated periodically and dynamically in response to connectivity anomalies that require immediate action (event-driven failures). Periodic updates are triggered by timer events which are loosely synchronized throughout the network. Three timing signals or commands are used, START_TU, FIN_TU AND INS_TB, which are defined in Table 6, shown in FIG. 11.

The time interval between START_TU and FIN_TU is made sufficient to allow the flood of topology update messages to have propagated to all nodes of the network. In addition, there is sufficient time between FIN_TU AND INS_TB to enable each node to compute new routing tables so that all nodes can install the new tables upon receipt of the command INS_TB.

In addition to these periodically generated command signals, in the event of a link failure (detected by the status monitor at the node) a command LNK_FAIL is generated to advise the node, and the network, that a link failure has been detected (the link is no longer responding).

The routing mechanism itself is driven by three types of messages listed in Table 7, shown in FIG. 12, two which, PATH (used to indicate a reachable node) and NO_PATH (used to indicate an unreachable node) have been described above in connection with rerouting in response to an event-driven failure. The third type of message, TOP_MSG, is used during periodic topology update and is flooded over the entire network to allow each node to construct a global topology table. The structure of the TOP_MSG message is set forth in Table 8, shown in FIG. 13, while those of the PATH and NO_PATH messages are itemized in Table 9, shown in FIG. 14. In addition, Table 10, shown in FIG. 15, contains a list of variables employed in the routing mechanism.

Within Table 10, the sequence number $N_s$ is derived from the time of day 'time' such that it is incremented by a value of 1 on each routing update. This number is used in the topology update messages and is the same at all nodes on a given iteration. Since routing table updates for all nodes of the network are installed at approximately the same time, in response to a flood message, the routing mechanism is effectively synchronous.

Table 11, shown in FIG. 16, sets forth the overall sequence of routines that make up the routing mechanism of the present invention. As shown therein the topology update (TU) process is initiated at each node at approximately the same time with the command START_TU. Each node determines its local status and causes a flood of this information to all other nodes with the execution of (Send_Flood (TOP_MSG)). The updates from the other nodes will arrive at a given node in an indeterminate sequence and with unknown timing. Each message (packet) arrival triggers the TOP_MSG event which causes the local tables to be updated with new information (Update_Top_Tables (TOP_MSG)). The time window for the installation of the updates is sufficiently wide to ensure with a very high probability that topology update messages from all the other nodes of the network have been received.

Upon completion of the topology update interval the command FINISH_TU, which starts the routing update calculation (Multiple_Path_Route ( )) is initiated. This routine uses current topology and metric information and runs to completion. In the event that a topology update message from another node is not received prior to the FINISH_TU event, it will not affect the current update calculation. However, receipt of that message will trigger a TOP_MSG event upon its arrival and cause appropriate modification of the topology and metric tables. In other words, topology update messages will always be accepted asynchronously into the routing calculation. Finally, the event INS_TABLES is generated to cause the newly created routing tables to be installed (Swap (new_$\phi\nu'$, old_$\phi\nu'$_)).

The events or routines listed in Table 11 are set forth in the order of priority of execution. The first three events (START_TU, FINISH_TU and INS_TABLES) are timer-based and are the only events which require relatively immediate attention from the node's control processor. However, to ensure accuracy of execution, each event must be processed without interruption prior to initiating the execution of a new event. During the execution of the remaining events (4–7) if a timer-based command is generated during the execution of any one of the events, the small delay needed to complete processing of the previous event will not negatively impact timing. In addition, timer-based events do not compete with one another for attention of the control process since a significant delay is allotted between the occurrence of each event. The timing delay between START_TU and FINISH_TU is sufficient for global propagation of the flood (on the order of 1 second). The timing delay between FINISH_TU and INS_TABLES is also sufficient to allow calculation of the routing tables. The time window required will depend upon the speed of the control processor assigned to the execution of the task. However, execution is given a high priority since it must be completed prior to the occurrence of the routing table installation event (INS_TABLES).

The events associated with the rerouting of the network in response to a link failure, described above (events 5, 6 and 7) are executed on a localized basis.

As described above, Table 11 sets forth the overall sequence of routines or the timings of the discrimination of topology and congestion information that make up the routing mechanism of the present invention.

Upon the occurrence of the command START_TU command, each of the nodes of the network assemblies a message containing a summary of characteristics of local status which are required by the other nodes to complete the adaptive routing function. This task is carried out by the routine ASSEM_STATUS (TOP_MSG) the routine sequence for which is set forth in Table 12, below. These summary messages are flooded throughout the network, so that they can be delivered to all destination nodes without requiring routing tables. Upon the occurrence of the FINISH_TU event, it is assumed that all messages have been delivered and calculation of the new routing table begins. (As noted above, the interval between START_TU and FINISH_TU is sufficient to allow all messages to propagate to their required destinations.) The topology data base that is constructed at each node during this process as well as the procedure for updating the data base using the topology update messages will be explained below.

The topology update packet for each node, defined as specified in Table 8, referenced above, essentially contains the following information: 1-the address of the node from which the packet originates; 2-the addresses of all directly connected nodes; 3-a congestion metric for each link between the nodes; and 4-a sequence number which identifies the time of origination of the topology update. These packets are given highest priority in flooding them through the network in order to ensure delivery within the allocated time interval.

Errors caused by missing a topology update will not propagate, since each node transmits a list of directly connected nodes, not simply changes to the connectivity of that node. In order to prevent more serious consequences due to update message anomalies, all information is employed for constructing the best possible estimate of topology.

The procedure employed to sample local status and assemble a topology update message TOP_MSG to be flooded throughout the network is set forth in Table 12, as pointed out above. As shown therein, after initialization in which the node_id and the appropriate sequence number are inserted into the message, the primary task of the routine is to place the local backbone connectivity and the corresponding link metrics in the message. For this purpose, the data structure shown in Table 14 is employed. A copy of the data structure, identified as Prev_Status, contains the current status used on the previous topology update while Status contains the current status.

The sequence contains a pair of loops, both of which iterate over the link index k to examine all links that are updated. The first 'for' loop examines the status of all backbone neighbors and fills in the neighbors field of TOP_MGS. Initial calculations on link utilization are also carried out during this loop. The second 'for' loop makes final adjustments to link utilization, calculates link metrics, and fills in the 'metrics' field of TOP_MSG. 'Status" is then saved as 'Prev_Status' for the next update cycle.

The calculation of the link metrics may be impacted by the occurrence of changes in topology of the network. Such changes include an imminent link outage due to nodes about to fail, new nodes or links which have been added, or an unpredictable link or node outage that has occurred.

It is assumed that a predictable link outage can be determined in advance of the actual outage by knowledge of the network dynamics. The function Link_Outage () returns TRUE for several iterations (typically on the order of 3) in advance of the actual outage of the link. The metric for this link is increased fictitiously over this interval in a monotonic fashion in order to drive the flow on this link to zero within the number of iterations (3 updates). This is accomplished by multiplying the assumed value of link capacity by a factor $\beta < 1$ (e.g. $\beta = 0.6$) on each of the iterations, as shown in Table 12, shown in FIG. 17.

For the case of the addition of new links, Table 12 shows that link utilization is initialized to a relatively large value (e.g. 0.9) in order to limit the usage of a link which might be overwhelming.

Where a link failure has occurred, the flow in the link must be shifted to other links, namely rerouted, as described above. To minimize the transient nature of the rerouting procedure, the metric is calculated by using an upward adjustment on the utilization of each link. This is somewhat predictive because the links will typically have to carry a greater load. The capacities on the previous topology and the current topology updates are denoted in Table 12 by cap_prev and cap_cur, respectively. The normalized lost capacity is denoted by lost_p. It should be noted that for the second 'for' loop, the p on each link is adjusted upward by an amount proportional to the product of the lost_p and $(1-p)$. The simplest part of the routine is the change in p that is made when the link status has not changed since the last topology update. In this case, the new value of p is averaged with the previous averaging of p according to the simple first-order filter with parameter $\alpha$, as described above.

It should also be noted that the routine Metric() is employed to compute the link metrics after all of the adjustments on the link utilizations are completed.

Topology update packets are then broadcast to all nodes using a flood routing mechanism as set forth in Table 13, shown in FIG. 18.

In this routine, the only state that must be retained is the current sequence number $N_s$ and an array of sequence numbers for the last accepted topology messages for each node Messages[]. The 'if' clause detects new messages (those for which the sequence number matches the current Ns and the last accepted message from that node did not have the sequence number). In this case, Messages[] array is updated to reflect the newest accepted message. Then, the procedure Gen_Event (TOP_MSG, pkt.DATA), generates a TOP_MSG event which ultimately calls the routine Update_TOP_tables() which, in turn, updates the topology data base with the new information contained in the packet. The message is then transmitted on all links except the original link on which it was received. The 'else' clause catches the condition that the message has been previously accepted; therefore, it is discarded. Implicit in this operation is the fact that the lifetime of a network topology update message is the interval between successive START_TU events, as described above. The sequence numbers change on each START_TU event.

The structure of the topology database is shown in Table 14, shown in FIG. 19. A sequence number for each node allows identification of the topology update interval originating the most recently received topology update message from each node. Another type of record for each node is back_top which contains relevant data on the backbone connectivity for each node.

The structure of back_top will allow the use of some redundancy in the topology updates received from the two nodes at either end of each link. The array of sequence numbers is employed to store sequence number corresponding to the last topology update received from each neighbor node. The primary status is assumed to come from the backbone node in question; however, if this topology update message is never received, missing details can be filled in by the updates from neighbor nodes.

Table 15, shown in FIG. 20, sets forth the details of the procedure Update_TOP_Tables() which is initiated upon the reception of a topology update message from a node. This first 'for' loop compares the back bone neighbor nodes listed in the topology update message with the previous database entry for 'node'. This comparison reveals all links to neighbor nodes that have been deleted since the last update (executed by the function Mess_Member() ). For each deleted link, any remaining reference to that link is also deleted from the database entry of the neighbor node by the procedure Delete (). Next, the pertinent information in TOP_MSG is copied into the database entry 'node'. This includes seq_no, no_neighbors, and the lists of neighbors and metrics. The third 'for' loop begins a process of 'scrubbing' the database to find inconsistent entries. Preferenc is always given to the most recent update during this scrubbing procedure. A link to a neighbor's node will be deleted from the topology database if both 'node' and 'nbrs' (neighbors) do not agree that the link exists and the current update has been received on both nodes. The function DB_Member (TOP_DB, nbrs, node) checks the entry for 'nbrs' to identify that a link exists to the 'node'. Any inconsistencies are deleted in the 'for all' loop. This marks all links as DOWN for which the nodes as the two ends of the link cannot agree on its status. The purpose of the final 'for' loop is to update the database for each neighbor node for which the current topology update message has not yet been received. If the link (nbrs, node) already exists in the database of nbrs, then the link is added to the database routing Add_Link (TOP_DB, nbrs, node, seq_no). This routine also sets the link metric for the (nbrs, node) link to be the same that was received from the 'node' for the (node, nbrs) link. These entries are maintained until the end of the next update (periodically or event-driven).

In the foregoing description of the network routing mechanism of the present invention, each data packet to be transmitted through the network from a source node to a destination node is treated independently of other data packets. By so doing, near optimal allocation of the feasible routes is achieved in a straight forward manner by distribution of the traffic in accordance with the path metric tables that are stored at each node. Where messages are subdivided into individual data packets, appropriate header information is included in the contents of the packet to permit reassembly at the destination.

In some instances, however, it may be appropriate to transmit information from a source to a destination so that it travels the same path and arrives at the destination in sequence. In this circumstance, the connectivity of the network between a source and a destination node assumes the configuration of a virtual circuit, rather than a datagram.

Pursuant to the present invention, the routing and traffic allocation mechanisms described above, may be applied to networks that have been configured to operate as virtual circuits or for a network configured to provide both datagram and virtual circuit capability. Virtual circuit routing is effected in substantially the same manner as the datagram mechanism, described previously, wherein a loop-free feasible path to the destination is defined. This route, preferably having a lowest possible path metric total, over which the data packet traffic travels, becomes a permanent virtual circuit route. The routing variables that are established in accordance with the path metrics are used to select from among feasible paths at each node. The route selection process distributes the load, so that the average load carried by the virtual circuit approximates the distribution implied by the routing variables. The virtual circuit route from source to destination will remain dedicated for that purpose until rerouting is required, either due to a link failure along the route or due to traffic congestion. The virtual circuit mechanism, to be described below, interfaces with the datagram routing mechanism detailed above in two locations. Routines are run periodically subsequent to each topology update (during the processing of the FINISH_TU event). These routines depend upon the most recent update of the routing variables, so that they must be exercised after the Multiple_Path_Route () procedure is completed. The other interface point occurs during event-driven failure recovery. When a link has been detected as being nonfunctional (failed) the virtual circuit traversing the link must be disconnected and rerouted. This interface procedure occurs during the routine Unreach_Node().

Applying the routing mechanism of the present invention to virtual circuit routing, while, at the same time, keeping the loading properly balanced, requires the consideration of changes to the virtual circuit routing in response to the three events: 1-a new virtual circuit is assigned as a result of a request for an end node-to-end node connection; 2-a virtual circuit must be disconnected due to completion of the communication or the detection of a failure; and 3-a virtual circuit must be rerouted to prevent congestion (the equivalent to a disconnect and a connect).

The routing variables $\phi_{ik}{}^j$ established during the multiple path routing mechanism update are used to represent the sum of both virtual circuit and datagram traffic. Accordingly, virtual circuits will be assigned as requested. In order to properly distribute the load, it is necessary to know the average load required for all virtual circuits and for datagram traffic. In the explanation to follow a virtual circuit request for a connect is considered to have a parameter c which identifies the expected load required for that virtual circuit. This is used in initial virtual circuit assignment in order to minimize congestion. Once the virtual circuit has been established, all traffic transmitted over that circuit results in an update of the long-term average load in a routine identified as vckt_in.load, to be described below, which is used for subsequent load adjustments. The long-term average has a much longer time constant than the link load average used to determine the link metric and ultimately the $\phi_i{}^j{}_k$. Additional variables for determining the load are the following:

$\gamma_k$: the total load on data link k;

$V_i{}^j$: the total virtual circuit load node i destined for node j;

$d_i{}^j$: the total datagram load at node i destined for node j;

$t_i{}^j$: the total load at node i destined for node j, $(d_i{}^j + V_i{}^j)$; and $u_{imk}{}^j$: the virtual circuit load at node i which is destined for node j that is routed over link (i, $m_k$).

The call setup and disconnect procedures are formulated using four types of messages hereinafter denoted VC_REQ, VC_RSP, VC_REJ and VC_FIN. The message VC_REQ is sent initially among the nodes in the path to begin the set-up of the transmission. No distinction is made between one message that originates internal to a node in an above layer and one which is received by way of a data link. This message causes an initial local circuit assignment with its state variable set to 'opening' followed by the transmission of VC_REQ to the next node in the path. The virtual circuit is considered to be 'connected' when a VC_RSP message is returned from the destination node. Alternately, a VC_REJ message may be returned which triggers a search for an alternate path. Finally, a circuit is 'closed' on receipt of a VC_FIN message.

Table 16, shown in FIG. 21, below sets forth the sequence of the routine Assign_New_$_{VC()}$ *for assigning a new virtual circuit in response to a VC_*REQ message. The procedure is initiated by updating $V_{ij}$ and VC_Table[] to reflect the incoming link and circuit on which the VC_REQ message arrived. The datagram routing variable $\zeta_{imk}{}^j$ has been defined to indicate the fraction of datagram traffic destined for node j that is routed over link $(i,m_k)$ and implies ample capacity to assign a new virtual circuit $(i,m_k)$. Consequently, the link having the largest datagram routing variable is initially selected as the preferred link for setting up the connection with the 'for' loop. If $\zeta_{best}>0$, excess capacity is available for a new virtual circuit. In this case, an output circuit assignment is obtained and the VC_Table[] and VC_Ret-Table[] are updated. Next, a VC_REQ message is sent to the next node, $m_{best}$, to determine whether it may accept a new virtual circuit. If it cannot accept a new virtual circuit, the node which requested the virtual circuit is notified that none is available, by way of a VC_REJ message, and the previous assignment is freed up by routine Free_Ckt_Tables(). It is to be observed that if there is no available circuit on 'best', then the node sends a dummy VC_REJ to itself which will ultimately cause recovery to take place.

If the virtual circuit is accepted by way of receipt of the message VC_RSP, the load averages $V^j$, $\gamma_{link}$ and $u_{imbest}^j$ must be updated to reflect the addition of a new virtual circuit. This is accomplished by the routine Complete_New_VC() set forth below in table 17, shown in FIG. 22.

Next, the routine Update_Tables() sets the circuit state variable to 'connected'. Once this has been completed, the datagram routing variables are changed to reflect the new distribution of the virtual circuit flow by the procedure Reassign_$\zeta$() as set forth in Table 18, shown in FIG. 23.

The purpose of the routine Reassign_$\zeta$() is to adjust the datagram routing variables to make the overall traffic distribution (including both datagrams and virtual circuits) closely approximate the intended routing variable $\phi^j_{imk}$. Based upon the estimated average traffic flow over the virtual circuit as well as the datagram traffic, this routine calculates the relative excess traffic flow that may be assigned to link (i,mk), after account for the dedicated virtual circuit traffic. This relative flow is denoted by:

$$\delta = (t_i^j \phi^j_{imk} - u^j_{imk})/d_i^j$$

The above expression assigns a nonnegative proportionality variable $\psi_{imk}^j$ of datagram traffic which is normalized to produce the datagram routing variables $\zeta_{imk}^j$ which are nonnegative and sum to 1 for each node (i,j) pair. It should also be noted that the link traffic $\gamma_k$ is modified by subtracting the previous datagram load $x_k$ and adding the new data gram load.

If a node receives a virtual circuit reject message VC_REJ for a circuit it has previously requested, it must either try to reroute the circuit or send virtual circuit reject message to the original requesting node. This is effected by the procedure Handle_VC_REJ, set forth in Table 19, shown in FIG. 24. The link on which the reject message VC_REJ was received is added to the list of blocked links. The node next looks for the best link, not blocked, for an alternative route. The remaining code is substantially the same as the procedure Assign_New_VC() defined in Table 16.

Once in place, the connection of a virtual circuit is quasipermanent; it may need to be disconnected either due to completion of the transmission or due to a failure. In the case of a failure, the process is initiated by the node detecting that a link has gone down by sending VC_FIN message, as noted previously. The handling of this message is straightforward and defined by the routine Disc_VC() set forth in Table 20, shown in FIG. 25.

The virtual circuit finish message may be received on either the 'link_in' or the 'link_out'; one of the purposes of this routine is to propagate the message out on the other link. Consequently, the variable 'direction' indicates which case is chosen by assuming one of the values fwd (forward) or rev (reverse). In addition, a disconnect may be generated locally by the node detecting the failure. Using this information, the routine first looks up all of the relevant variables in the virtual circuit tables using the routine Look_Up(). Then, $u_{im\_link\_out}^j$, $v_i^j$ and $\gamma_{link\_out}$ are decreased by the amount of the load of the virtual circuit that is about to be disconnected. Next, the virtual circuit finish messages VC_FIN are transmitted. After freeing the virtual circuit table entries, the routine Reassign_$\zeta$ (des) is executed to adjust the datagram routing variables for the destination 'dest'.

In the event that a virtual circuit needs to be rerouted in order to prevent congestion in responses to changes in traffic load and network topology, the adjustment procedure set forth in Table 21, shown in FIG. 26, is implemented. This procedure is called periodically after the completion of the multiple path routing update mechanism (Multiple_Path_Route ()) which produces an updated set of target routing variables $\phi_{imk}^j$. Typically, the procedure may reroute a small fraction of the virtual circuits in order to better balance the load. Since all virtual circuits are candidates for rerouting, the two 'for' loops iterate for all destinations, j, and all virtual circuits in the table $V_{ij}$.

Initially, each virtual circuit is examined to determine that it is still routed over a feasible route. If not, the virtual circuit is disconnected by accessing the previously defined procedure Disc_VC (). In this case, the parameter 'direction' is set to 'both', so that virtual circuit finish messages $VC_{13}$ FIN will be sent out on the circuit in both directions. For each virtual circuit that is routed over a feasible route, the route is checked for proper load balance. Some virtual circuits may be disconnected at random with the proability of disconnect increasing if there is significantly more virtual circuit traffic on a link than is warranted by the routing variable, i.e. a larger value of $\delta 1$. The function 'rand' (0,1) produces a random variable which is uniformly distributed between the values 0 and 1. The last 'if' clause of Table 21 compares this random variable against a number which is less than 1 and which reflects the need to reroute the virtual circuit. A negative value $\Delta_1$ causes the test to fail and the circuit will not be disconnected. The parameter E is chosen to be small, so that the virtual circuits are disconnected for this purpose quite infrequently.

After rerouting the virtual circuit, adjustments to the datagram variables are carried out by using the procedure Reassign_DG () as set forth in Table 22, shown in FIG. 27, which is similar to the procedure Reassign_$\zeta$ () of Table 18. The major difference is that the procedure of Table 22 updates the datagram routing variables for all destinations rather than for a single destination.

As will be appreciated from the foregoing description, the 'feasible route' selection scheme in accordance with the present invention obviates the drawbacks of conventional traffic allocation schemes, while improving speed of route assignment and maximal use of entire network capacity. As a consequence of this traffic allocation process, loading of the feasible routes of the network is effectively balanced with minimum average delay. In addition, the dynamic routing capability may be augmented to establish and control the allocation of traffic over virtual circuits within the network, which are intended to coexist with dynamic transmission routing. In this instance use of the virtual circuits and dynamic feasible routes of the network is allocated so as to effectively balance the flow of communication traffic over each of the available communication routes.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use in a multinode communications network having a plurality of communication nodes each of which is capable of transmitting communication signals to and receiving communication signals from other nodes of the network, so that at least one transmission route from a source node to a destination node may be established among plural nodes of the network, a method of establishing at least one transmission route between a source node at which communication signals originate and a destination node for which communication signals originating at said source node are to be transmitted comprising the steps of:
   (a) monitoring transmission characteristics of each of the transmission paths among the nodes of the network so as to derive therefrom a plurality of path metrics representative of the ability of the transmission paths of the network to transmit communication signals thereover;
   (b) selecting, as feasible transmission routes to be used for the transmission of communication signals from said source node to said destination node, those routes which extend from said source node through neighbor nodes thereof to said destination node and each of which is comprised of one or more transmission paths among the nodes of the network the sum of path metrics of transmission paths from said neighbor nodes to said destination node is less than the path metric of a transmission path the end nodes of which correspond to said source and destination nodes; and
   (c) transmitting communication signals from said source node to said destination node over the feasible transmission routes selected in step (b).

2. A method according to claim 1, wherein step (c) comprises allocating the use of each of said selected feasible transmission routes for the transmission of communication signals thereover in accordance with a prescribed relationship between the path metric sum for said each of said selected feasible transmission routes and the path metrics of the other selected feasible routes.

3. A method according to claim 2, wherein step (c) comprises allocating the use of each of said selected feasible transmission routes for the transmission of communication signals thereover in accordance with the ratio of the inverse of the path for said each of said selected feasible trnsmission routes metric sum to the total of the inverse of the path metric sums of each of said feasible routes.

4. For use in a multinode communications network having a plurality of communication nodes each of which is capable of transmitting communication signals to and receiving communication signals from other nodes of the network, so that at least one transmission route from a source node to a destination node may be established among plural nodes of the network, a method of establishing at least one transmission route between a source node at which communication signals originate and a destination node for which communication signals originating at said source node are to be transmitted comprising the steps of:
   (a) monitoring transmission characteristics of each of the transmission paths among the nodes of the network so as to derive therefrom a plurality of data representative of the ability of the transmission paths of the network to transmit communication signals thereover;
   (b) selecting, as feasible transmission routes to be used for the transmission of communication signals from said source node to said destination node, those routes which extend over transmission paths from said source node to said destination node and contain those neighbor nodes of said source which are located closer to said destination node than said source node; and
   (c) transmitting communication signals from said source node to said destination node over the feasible transmission routes selected in step (b).

5. A method according to claim 4, wherein step (c) comprises allocating the use of each of said selected feasible transmission routes for the transmission of communication signals thereover in accordance with a prescribed relationship between the sum of the transmission capability data derived for the paths of said each of said selected feasible transmission routes and for the paths of the other selected feasible routes.

6. A method according to claim 5, wherein step (c) comprises allocating the use of each of said selected feasible transmission routes for the transmission of communication signals thereover in accordance with the ratio of the sum of the transmission capability data for the paths of said each of feasible transmission routes to the total of the data sums of each of said feasible routes.

7. A method according to claim 4, further including the step of:
   (d) in response to the occurrence of a failure of at least a portion of a transmission route between nodes of the network, reperforming step (b) in accordance with transmission capability data monitored in step (a) for feasible routes exclusive of the route in which said failure has occurred; and
   (e) transmitting communication signals from said source node to said destination node over the feasible transmission routes selected in step (d).

8. A method according to claim 7, wherein step (c) comprises allocating the use of each of said selected feasible transmission routes for the transmission of communication signals thereover in accordance with a prescribed relationship between the sum of the transmission capability data derived for the paths of said each of said selected feasible transmission routes and for the paths of the other selected feasible routes.

9. A method according to claim 8, wherein step (c) comprises allocating the use of each of said selected feasible transmission routes for the transmission of communication signals thereover in accordance with the ratio of the sum of the transmission capability data for the paths of said each of said feasible transmission routes to the total of the transmission capability data sums of each of said feasible routes.

10. For use in a multinode communications network having a plurality of communication nodes each of which is capable of transmitting communication signals to and receiving communication signals from other nodes of the network, so that at least one transmission route from a source node to a destination node may be established among plural nodes of the network, a method of establishing at least one transmission route between a source node at which communication signals originate and a destination node for which communication signals originating at said source node are to be transmitted comprising the step of:

(a) monitoring transmission characteristics of each of the transmission paths among the nodes of the network so as to derive therefrom a plurality of data representative of the ability of the transmission paths of the network to transmit communication signals thereover;

(b) selecting, as a virtual circuit to be used for the transmission of communication signals from said source node to said destination node, one of those routes which extend over transmission paths from said source node to said destination node and contain those neighbor nodes of said source which are located closer to said destination node than said source node; and (c) transmitting communication signals from said source node to said destination node over the virtual circuit selected in step (b).

11. A method according to claim 10, wherein step (b) further includes the step of selecting, as feasible transmission routes to be used for the transmission of communication signals from said source node to said destination node, others of those routes which extend over transmission paths from said source node to said destination node and contain only nodes which are neighbor nodes of said source node and are located closer to said destination node than said source node, and step (c) comprises transmitting communication signals from said source node to said destination node over said feasible transmission routes selected in step (b).

12. A method according to claim 11, wherein step (c) comprises allocating the use of each of said virtual circuit and said selected feasible transmission routes for the transmission of communication signals so as to effectively balance the flow of communication traffic thereover.

13. In a multinode communications network having a plurality of communication nodes each of which is capable of transmitting communication signals to and receiving communication signals from other nodes of the network, so that at least one transmission route from a source node to a destination node may be established among plural nodes of the network, an arrangement for establishing at least one transmission route between a source node at which communication signals originate and a destination node for which communication signals originating at said source node are to be transmitted comprising:

means for monitoring transmission characteristics of each of the transmission paths among the nodes of the network so as to derive therefrom a plurality of data representative of the ability of the transmission paths of the network to transmit commtnication signals thereover; and means for transmitting communication signals from said source node to said destination node over those transmission routes which extend over transmission paths from said source node to said destination node and contain those neighbor nodes of said source which are located closer to said destination node than said source node.

14. An arrangement according to claim 13, further including means for allocating the use of each of said transmission routes for the transmission of communication signals thereover in accordance with a prescribed relationship between the sum of the transmission capability data derived for the paths of said each route and the paths of the other routes.

15. An arrangement according to claim 13, wherein said allocating means comprises means for allocating the use of each of said transmission routes for the transmission of communication signals thereover in accordance with the ratio of the sum of the transmission capability data for the paths of said each of said feasible transmission routes to the total of the data sums of each of said routes.

16. An arrangement according to claim 15, further including means, responsive to the occurrence of a failure of at least a portion of a transmission route between nodes of the network, for transmitting communication signals from said source node to said destination node over those transmission routes which extend over transmission paths from said source node to said destination node and contain only nodes which are neighbor nodes of said source and are located closer to said destination node than said source node and are exclusive of the route in which said failure has occurred.

17. An arrangement according to claim 13, further including means for allocating the use of each of said transmission routes for the transmission of communication signals thereover in accordance with a prescribed relationship between the sum of the transmission capability data derived for the paths of said each route and those of the other routes.

18. For use in a multinode communications network having a plurality of communication nodes each of which is capable of transmitting communication signals to and receiving communication signals from other nodes of the network, so that at least one transmission route from a source node to a destination node may be established among plural nodes of the network, an arrangement for establishing at least one transmission route between a source node at which communication signals originate and a destination node for which communication signals originating at said source node are to be transmitted comprising;

means for monitoring transmission characteristics of each of the transmission paths among the nodes of the network so as to derive therefrom a plurality of data representative of the ability of the transmission paths of the network to transmit communication signals thereover;

means for selecting, as a virtual circuit to be used for the transmission of communication signals from said source node to said destination node, one of those routes which extend over transmission paths from said source node to said destination node and contain those neighbor nodes of said source which are located closer to said destination node than said source node; and means for transmitting communication signals from said source node to said destination node over the selected virtual circuit.

19. An arrangement according to claim 18, wherein said selecting means includes means for selecting, as feasible transmission routes to be used for the transmission of communication signals from said source node to said destination node, others of those routes which extend over transmission paths from said source node to said destination node and contain only nodes which are neighbor nodes of said source node and are located closer to said destination node than said source node, and said transmission means comprises means for transmitting communication signals from said source node to said destination node over said selected feasible transmission routes.

20. An arrangement according to claim 19, further including mans for allocating the use of each of said virtual circuit and said selected feasible transmission routes for the transmission of communication signals by said transmitting means, so as to effectively balance the flow of communication traffic thereover.

* * * * *